US012187300B2

(12) United States Patent
Oh et al.

(10) Patent No.: US 12,187,300 B2
(45) Date of Patent: Jan. 7, 2025

(54) SYSTEM AND METHOD FOR VEHICLE CONTROL WITH A MOBILE APP

(71) Applicants:Garry Oh, Santa Barbara, CA (US); Hung Huynh, Santa Barbara, CA (US)

(72) Inventors: Garry Oh, Santa Barbara, CA (US); Hung Huynh, Santa Barbara, CA (US)

(*) Notice: Subject to any disclaimer, the term of this patent is extended or adjusted under 35 U.S.C. 154(b) by 0 days.

(21) Appl. No.: 17/574,833

(22) Filed: Jan. 13, 2022

(65) Prior Publication Data
US 2024/0217528 A1    Jul. 4, 2024

(51) Int. Cl.
| | |
|---|---|
| *G06F 21/31* | (2013.01) |
| *B60W 10/10* | (2012.01) |
| *B60W 10/18* | (2012.01) |
| *B60W 10/20* | (2006.01) |
| *B60W 50/023* | (2012.01) |
| *G07C 5/08* | (2006.01) |
| *H04M 1/724* | (2021.01) |

(52) U.S. Cl.
CPC .......... *B60W 50/023* (2013.01); *B60W 10/10* (2013.01); *B60W 10/18* (2013.01); *B60W 10/20* (2013.01); *G06F 21/31* (2013.01); *G07C 5/0808* (2013.01); *H04M 1/724* (2021.01); *B60W 2556/45* (2020.02)

(58) Field of Classification Search
CPC .... B60W 50/023; B60W 10/10; B60W 10/18; B60W 10/20; B60W 2556/45; G06F 21/31; G07C 5/0808; H04M 1/724
See application file for complete search history.

(56) References Cited

U.S. PATENT DOCUMENTS

| | | | |
|---|---|---|---|
| 6,891,467 B2 | 5/2005 | Perttunen et al. | |
| 8,847,731 B2 * | 9/2014 | Tieman | G07C 9/00309 |
| | | | 340/426.36 |
| 9,211,811 B2 | 12/2015 | Breed | |
| 10,112,581 B2 | 10/2018 | Fernando et al. | |
| 2015/0148990 A1 * | 5/2015 | Patel | F02N 11/0807 |
| | | | 701/2 |

FOREIGN PATENT DOCUMENTS

EP    2543561 A1 *    1/2013    ............. B60R 25/25

* cited by examiner

*Primary Examiner* — Justin Holmes

(57) ABSTRACT

A system and method for control of a vehicle with a mobile app includes the configuration and providing of controllable vehicle components, a mobile device and a memory thereon containing a software to for determining if a malfunction has occurred in the control module of a vehicle, initiating vehicle control app on a mobile device, connecting to the mobile device, and allowing the mobile device to emulate and control the vehicle and its most vital components. The remote capability provided by interfacing with the vehicle's systems may be communicated wirelessly through protocols like Wi-Fi, Bluetooth, or Cellular, or through wired connections such as USB, the vehicle's OBD system, and AUX control. The system provides a redundant remote capability to a single point of failure for critical vehicle controls.

27 Claims, 18 Drawing Sheets

300 ⟶

Network Models

| TCP/IP Model | OSI Model | Example Protocol | VCA Use Case |
|---|---|---|---|
| Application Layer | Application Layer | FTP, HHTP, Telnet | VCA app |
| | Presentation Layer | JPEG, MPEG | Speedometer, Trunk Control, OBD, etc |
| | Session Layer | NFS, SQL, PAP | NFS, SQL, PAP |
| Transport Layer | Transport Layer | TCP, UDP | TCP, UDP |
| Network Layer | Network Layer | IPv4, IPv6 | IPv4, IPv6 |
| Network Access Layer | Data Link Layer | ARP, CDP, STP | ARP, CDP, STP |
| | Physical Layer | Ethernet, Wi-Fi | Wi-Fi |

FIG. 3

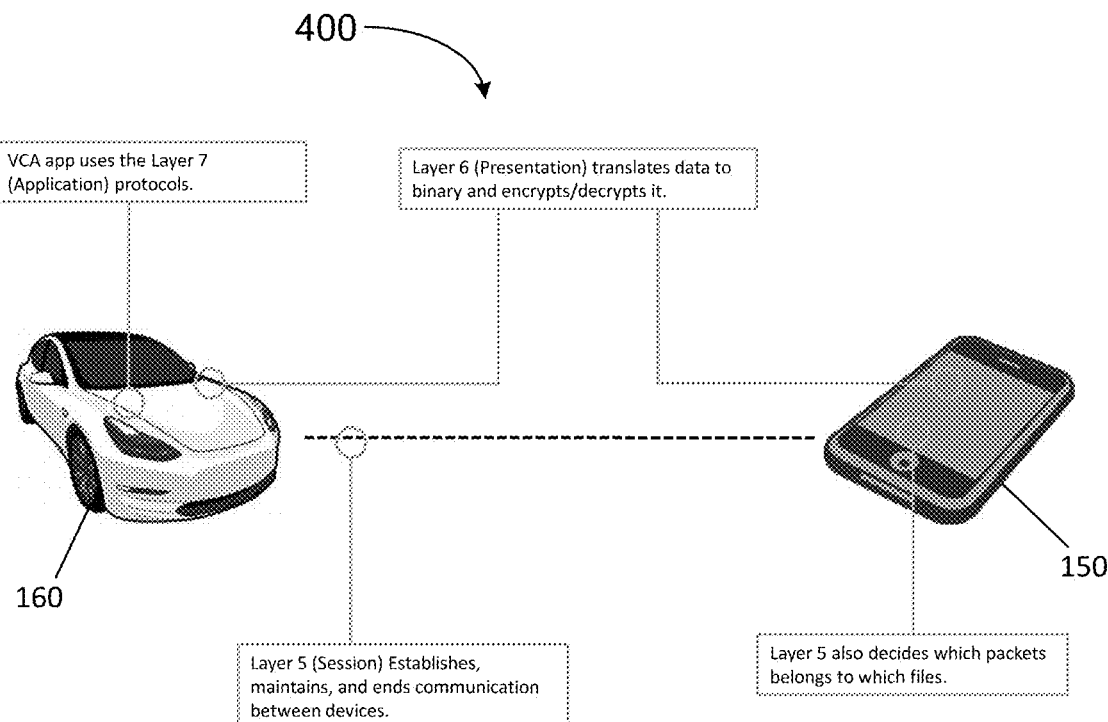

FIG. 4A

SYSTEM AND METHOD FOR VEHICLE CONTROL WITH A MOBILE APP

CROSS-REFERENCE TO RELATED APPLICATIONS

Not applicable

RELATED CO-PENDING U.S. PATENT APPLICATIONS

Not applicable

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to vehicle control systems. More particularly, certain embodiments of the invention relates to system and method for vehicle control.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that as more and more driver functionality is being incorporated into vehicle display systems, the physical hardware is being replaced with electronic components. OEM manufacturers may be incorporating control features into the driver experience, but aren't thinking about what happens if these features fail during critical situations.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is an illustration of an exemplary Wi-Fi architecture, in accordance with an embodiment of the present invention;

FIG. 4A is an illustration of an exemplary Wi-Fi architecture, in accordance with an embodiment of the present invention;

Figure 1:
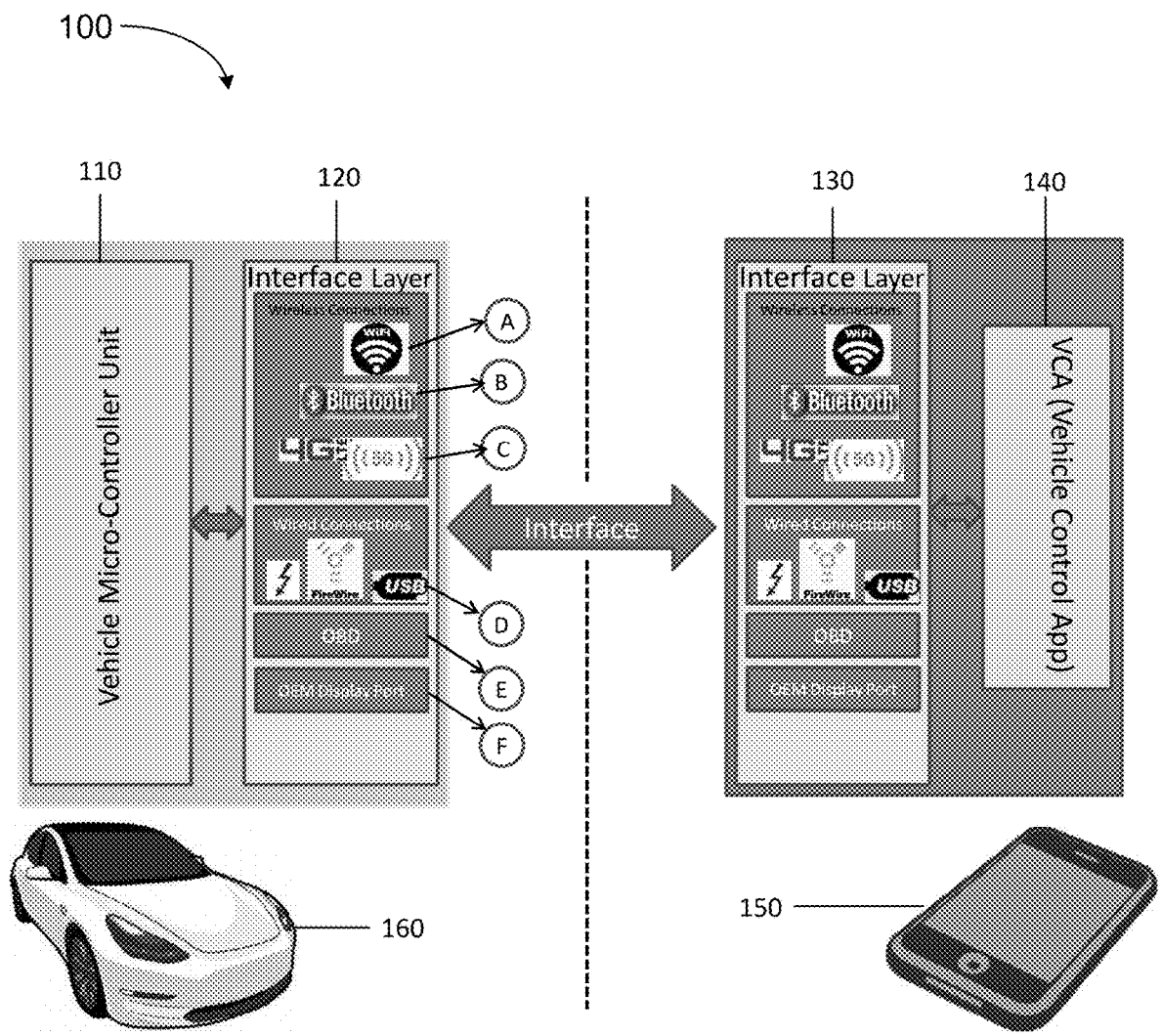
FIG. 1 is an illustration of an exemplary top level architecture diagram, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearward most point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys. Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys. Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said, "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred, or induced by any pattern(s) of description, embodiments, examples, or referenced prior-art that may (or may not) be provided in the present patent.

References to "end user", or any similar term, as used herein, are generally intended to mean late-stage user(s) as opposed to early-stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation.

As such, the mechanisms/unit/circuit/component can be said to be configured to (or be operable) for perform (ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform (ing) one or more tasks is expressly intended not to invoke 35 U.S.C. sctn. 112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components is described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java.TM., Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards, or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor-based memory, phase change memory, optical memory, periodically refreshed memory, and the like; the non-transitory computer readable medium, however, does not include a pure transitory signal per se; i.e., where the medium itself is transitory.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Some embodiments of the present invention and variations thereof, relate to vehicular control systems. In one embodiment of the present invention, the system may provide a remote capability that may interfaces with the vehicle's systems and the interface layer may be wireless or wired. Wireless communication examples may include, but not limited to, Bluetooth, cellular service, near-filed communication, infrared communications, and/or Wi-Fi. Wired communications may include, but not limited to, cables, USB, FireWire, twisted pair wire, etc. The system may provide a redundant capability to a single point failure for vehicle critical control. Something as simple as a malfunctioning display or control apparatus could render the vehicle useless. The Vehicle Control Application (VCA) may provide the necessary redundancy. The VCA may be initiated after verification including but not limited to biometric screening, password-based authentication, certificate-based authentication, token-based authentication, etc. A mobile device running the VCA may connect wired and/or wirelessly with the vehicle control unit and the vehicle control unit verifies that the user meets access criteria using near-field, Bluetooth, Wi-Fi, etc. The access criteria may include, but not limited to, sensing the user mobile device to be within a predetermined distance around the vehicle. Once user has access to the driver critical control features of the vehicle, the user may no longer be stranded. For example, the user may shift from park to drive, control steering, and access the vehicle instrumentation cluster information. The connection between the vehicle control unit and mobile device may be terminated when the vehicle is powered off or when the user no longer meets the access criteria. For instance, the user may be too far away from the vehicle where the user is outside the predetermined distance around the vehicle.

The present invention will now be described in detail with reference to embodiments thereof as illustrated in the accompanying drawings.

FIG. 1 is an illustration of an exemplary vehicular control system top level architecture diagram 100, in accordance with an embodiment of the present invention. In the present embodiment, the system may include, but not limited to, a vehicle 160 and a mobile device 150 where vehicle 160 may include but not limited to, a vehicle microcontroller unit 110 and a vehicle interface layer 120. Mobile device 150 may include but not limited to, a mobile device interface layer 130 and a vehicle control app (VCA) 140. Interface layers 120 130 may include but not limited to wireless connections such as but not limited to, Wi-Fi device A, Bluetooth device B, and 4G/5G LTE device C. Other wireless connections such as near field, infrared communication, In addition, wired connections may be available in the form of a USB device port D, OBD device port E, and OEM device display port F.

Figure 2:
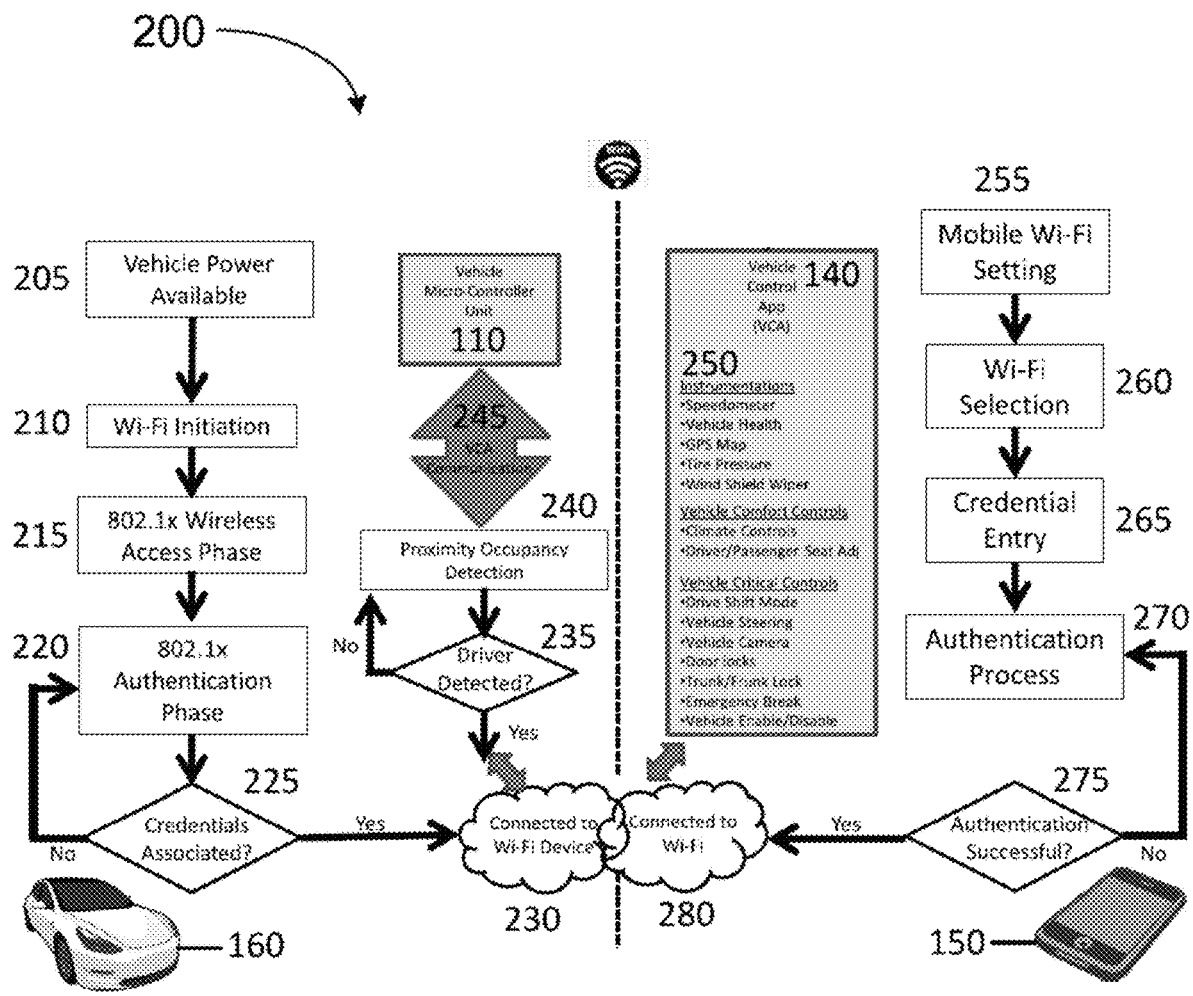
FIG. 2 is an illustration of an exemplary Wi-Fi flow diagram, in accordance with an embodiment of the present invention.

FIG. 2 is an illustration of an exemplary Wi-Fi flow diagram 200, in accordance with an embodiment of the present invention. In the present embodiment, Wi-Fi flow diagram 200 shows a method including checking whether power to vehicle 160 is sufficient, in Step 205. If vehicle 160 power is available, Wi-Fi device A is initiated, in Step 210. If a Wi-Fi connection is available, an 802.1x wireless access phase is started. The local vehicle's 802.1x Wifi interface initiates upon vehicle power availability and enters access phase per the 802.1x wifi standard and is ready to establish connections. The driver will initiate the application on his/her mobile device and will select the appropriate vehicle Wi-Fi network connection, in Step 215. In Step 220, the mobile device A will follow the 802.1x protocol by authenticating credentials with the vehicle's microcontroller unit 110. Once credentials are successfully verified and security established, the wifi connection is established, in Step 225. Instrumentations, vehicle comfort controls, and vehicle critical controls 250 may be accessed with the vehicle control app. Instrumentations may involve but not limited to a speedometer, vehicle health, GPS map, tire pressure, and wind shield wiper. Vehicle comfort controls may involve but not limited to climate controls and driver/passenger seat adjustments. Vehicle critical controls may involve but not limited to drive shift mode, vehicle steering, vehicle camera, door locks, trunk/frunk lock, emergency break, and vehicle enable/disable. In Step 255, the mobile device Wi-Fi setting may be setup by the vehicle control app (VCA). In Step 260, Wi-Fi connection may be selected in the mobile device. In Step 265, the user credential may be entered via the mobile device. In Step 270, the authentication process may be initiated. If the authentication process is not successful in Step 275, the authentication process in Step 270 may be re-initiated. If the authentication process is successful in Step 275, the mobile device may connect to Wi-Fi device A in Step 280. In Step 280, mobile device 150 may be setup to control the vehicle instrumentations, vehicle comfort controls, and vehicle critical controls 250.

FIG. 3 is an illustration of an exemplary Wi-Fi architecture 300, in accordance with an embodiment of the present invention. In the present embodiment, vehicle 160 and mobile device 150 may communicate using Wi-Fi which adheres to the TCP/IP or OSI network model as shown.

FIG. 4A is an illustration of an exemplary Wi-Fi architecture 400, in accordance with an embodiment of the present invention. In the present embodiment, the vehicle control app (VCA) may use the layer 7 (application layer) protocols as shown to allow the application to use the services of the network. Layer 6 (presentation layer) may be used to translate data to binary and encrypts/decrypts the data. Layer 5 (session layer) may be used to establish, maintain, and end communication between vehicle 160 and mobile device 150.

Figure 4B:
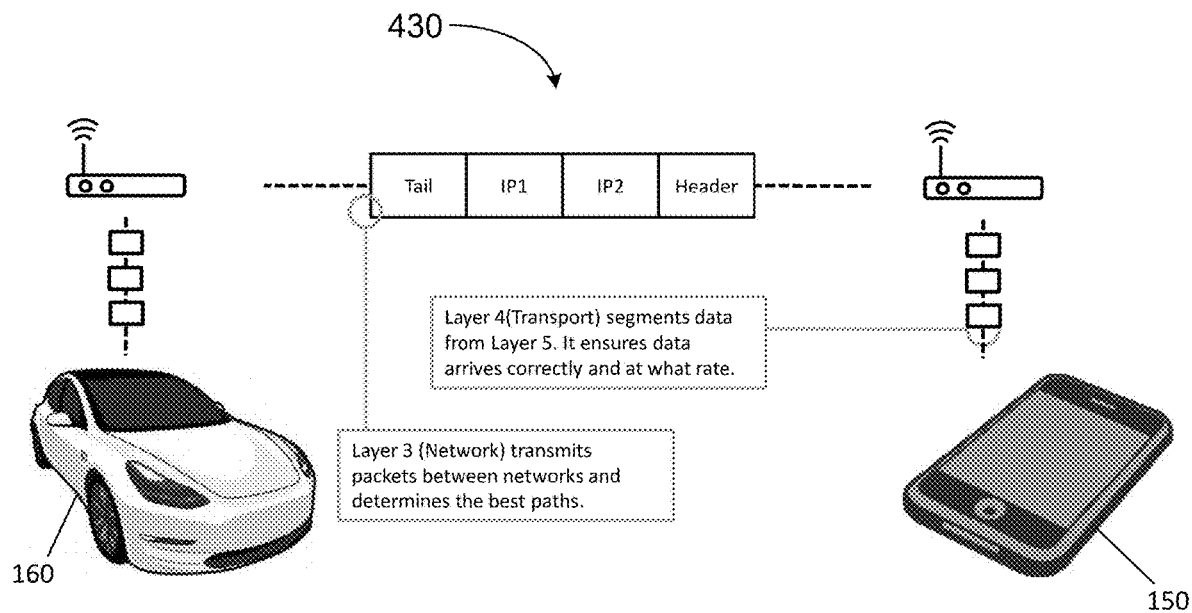
FIG. 4B is an illustration of an exemplary Wi-Fi architecture, in accordance with an embodiment of the present invention.

FIG. 4B is an illustration of an exemplary Wi-Fi architecture 430, in accordance with an embodiment of the present invention. In the present embodiment, as shown, Layer 3 (Network layer) may be used to transmit packets between networks and may be used to determine the best paths. Layer 4 (Transport layer) may be used to segment data from Layer 5. Layer 4 may be used to ensure that data arrives correctly and at what rate. FIG. 4B provides additional detail for activity in Layer 3 (Network layer) and Layer 4 (Transport layer) for this exemplary Wi-Fi architecture.

Figure 4C:
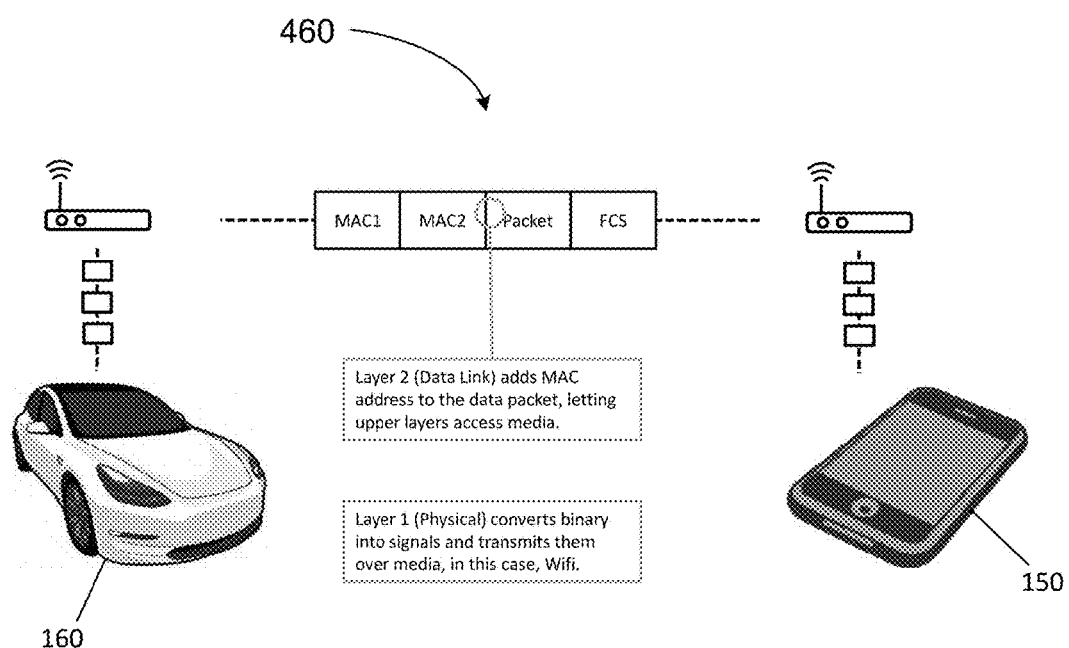
FIG. 4C is an illustration of an exemplary Wi-Fi architecture, in accordance with an embodiment of the present invention.

FIG. 4C is an illustration of an exemplary Wi-Fi architecture 460, in accordance with an embodiment of the present invention. In the present embodiment, as shown, Layer 1 (Physical layer) may be used to convert binary data into signals and transmits them over media, in this case, Wi-Fi. FIG. 4C provides additional detail for activity in Layer 2 (Data Link layer) and Layer 1 (Physical layer) for this exemplary Wi-Fi architecture.

Figure 5:
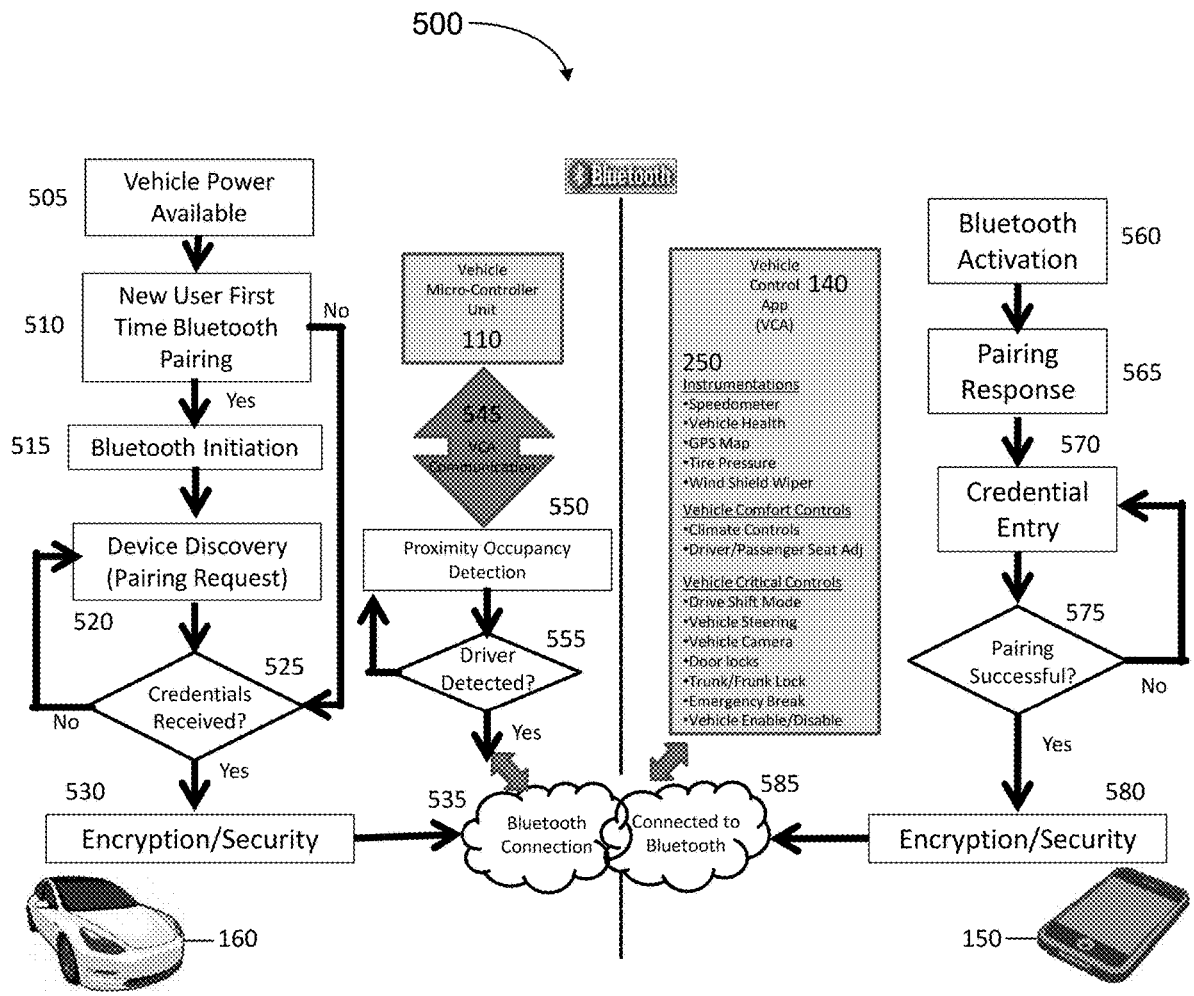
FIG. 5 is an illustration of an exemplary Bluetooth flow diagram, in accordance with an embodiment of the present invention.

FIG. 5 is an illustration of an exemplary Bluetooth flow diagram 500, in accordance with an embodiment of the present invention. In the present embodiment, Bluetooth flow diagram 500 illustrates a method including initially checking vehicle power in Step 505. If vehicle 160 power is available, the vehicle micro-controller unit checks if a new user (e.g., first time) Bluetooth pairing is to be established, in Step 510. If "Yes" or a new user Bluetooth pairing is to be established, Bluetooth pairing connection is initiated in Step 515. In Step 520, a device discovery or pairing request is broadcast. If "No" or the pairing is not new, the vehicle micro-controller unit requests the credentials of the connecting device in Step 525. In Steps 530-535, Bluetooth communication is encrypted for security. Instrumentations, vehicle comfort controls, and vehicle critical controls 250 may be accessed through vehicle microcontroller unit 110. Instrumentations may involve but not limited to a speedometer, vehicle health, GPS map, tire pressure, and wind shield wiper. Vehicle comfort controls may involve but not limited to climate controls and driver/passenger seat adjustments. Vehicle critical controls may involve but not limited to drive shift mode, vehicle steering, vehicle camera, door locks, trunk/frunk lock, emergency break, and vehicle enable/disable.

In the mobile device side, in Step 560, the mobile device Bluetooth may be activated. In Step 565, the mobile device responds to the vehicle Bluetooth pairing broadcast. In Step 570, the user credential is entered via mobile device 150. In Step 575, the pairing between the mobile device and vehicle is checked if successful. If pairing is successful ("Yes"), in Steps 580-585, Bluetooth communication may be encrypted for security and mobile device 150 may communicate with vehicle 160. At this point, the mobile device is setup to control the vehicle instrumentations, vehicle comfort controls, and vehicle critical controls. If pairing is unsuccessful ("No") in Step 575, user credentials may be re-entered.

Figure 6:
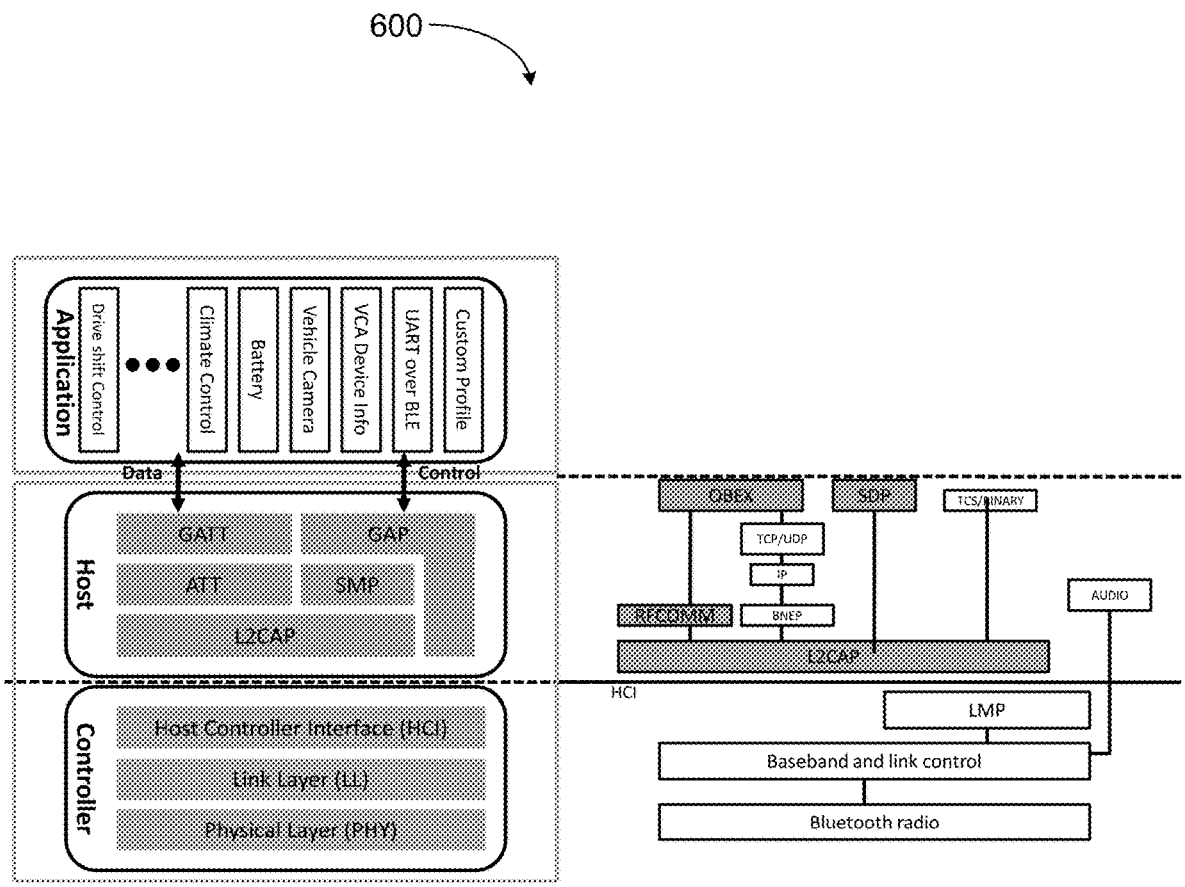
FIG. 6 is an illustration of an exemplary Bluetooth architecture, in accordance with an embodiment of the present invention.

FIG. 6 is an illustration of an exemplary Bluetooth stack architecture 600, in accordance with an embodiment of the present invention. The vehicle and the mobile device via VCA may communicate using Bluetooth Interface which adheres to the 2020 Bluetooth v5.2 standard or newer, as shown. The VCA application code sits atop the Bluetooth protocol stack.

Figure 7:
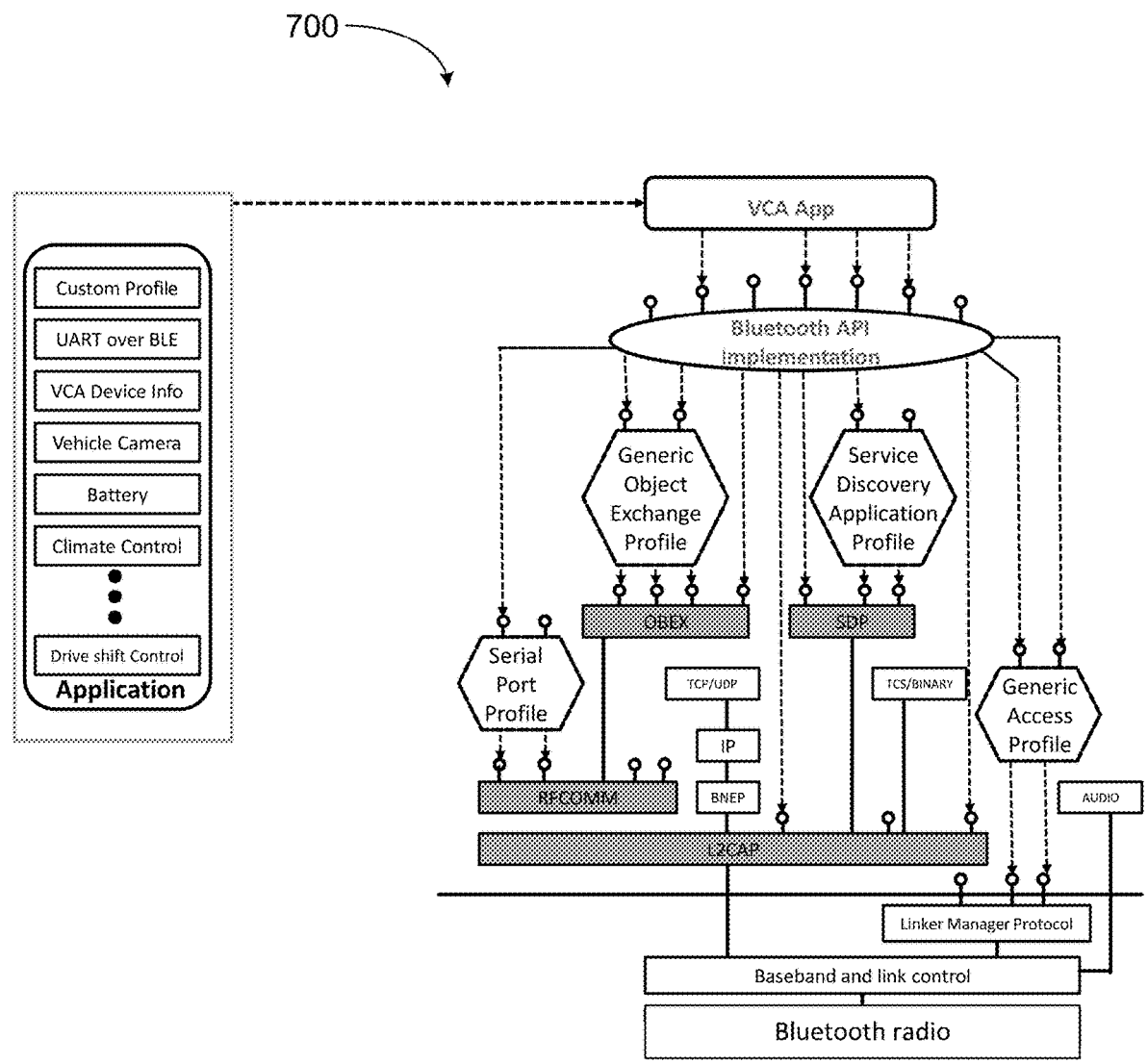
FIG. 7 is an illustration of an exemplary Bluetooth architecture, in accordance with an embodiment of the present invention.

FIG. 7 is an illustration of an exemplary Bluetooth architecture 700, in accordance with an embodiment of the present invention. As shown, using Bluetooth Development tool with API, VCA contents may access the Bluetooth physical layers. The VCA application code sits atop the Bluetooth protocol stack.

Figure 8:
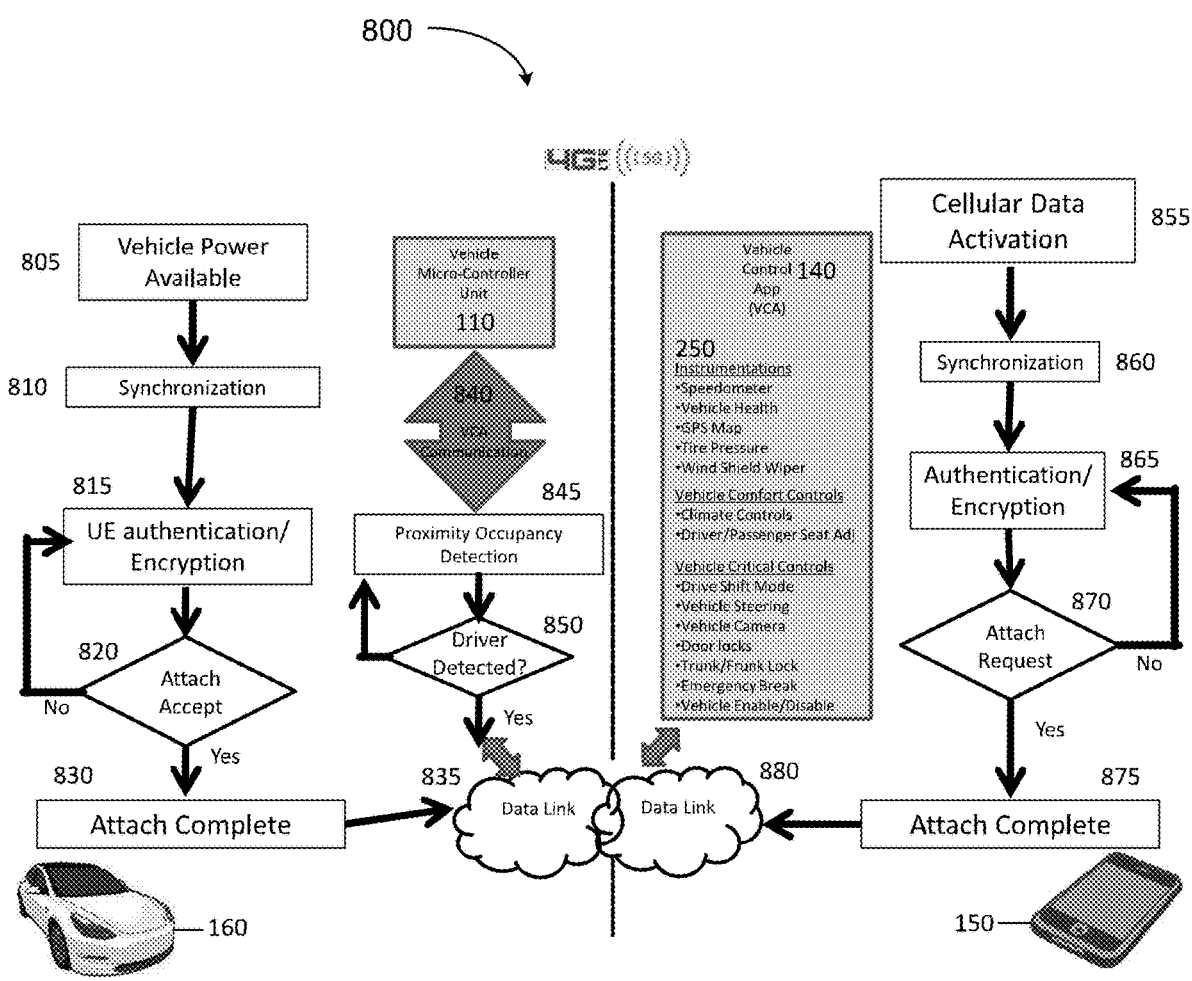
FIG. 8 is an illustration of an exemplary cellular protocol flow diagram, in accordance with an embodiment of the present invention.

FIG. 8 is an illustration of an exemplary cellular protocol flow diagram 800, in accordance with an embodiment of the present invention. In the present embodiment, cellular protocol flow diagram 800 shows a method that may include, in Step 805, checking for vehicle power. This is to ensure that there is ample power to activate communication and vehicle critical controls. If vehicle power is sufficient, synchronization of the mobile device (user equipment) to the microcontroller is initiated, in Step 810. In Step 815, the mobile device (user equipment) is authenticated and encrypted. In Step 820, verify if attach is accepted which signifies that the mobile device is now registered with the network, enabling the ability to send and receive data. If attachment is accepted ("Yes"), in Step 830, complete attachment. In Step 835, data link may be established. In Step 840, VCA communication with vehicle microcontroller unit 110 may be established where instrumentations, vehicle comfort controls, and vehicle critical controls 250 may be accessed by the vehicle control app (VCA) through vehicle microcontroller unit 110. Instrumentations may involve but not limited to a speedometer, vehicle health, GPS map, tire pressure, and wind shield wiper. Vehicle comfort controls may involve but not limited to climate controls and driver/passenger seat adjustments. Vehicle critical controls may involve but not limited to drive shift mode, vehicle steering, vehicle camera, door locks, trunk/frunk lock, emergency break, and vehicle enable/disable. In Step 845, proximity occupancy detection may be performed. In Step 850, determine whether a vehicle driver is detected. If the driver is determined to be inside the vehicle or within a predetermined distance to the vehicle ("Yes"), a data link with the mobile device may be established.

In the mobile device side, in Step 855, cellular data may be activated. In Step 860, synchronization is performed. In Step 865, the user is authenticated and encrypted. In Step 870, an attachment is requested from the mobile device to the microcontroller, which registers the device to the network. If attachment is granted ("Yes"), attachment is completed in Step 875. In Step 880, the mobile device may establish a data link. At this point, mobile device 150 is setup to control the vehicle instrumentations, vehicle comfort controls, and vehicle critical controls.

Figure 9:
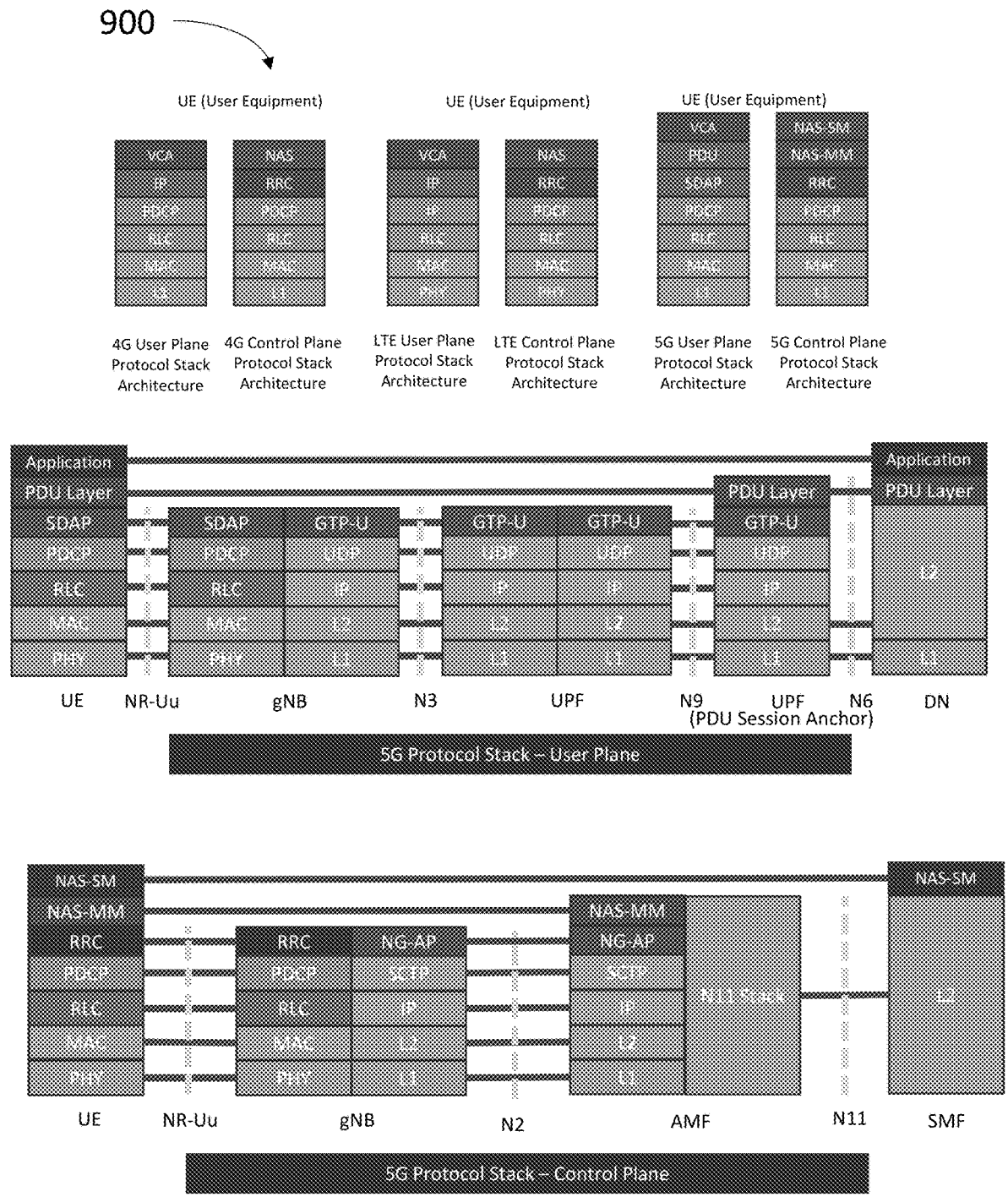
FIG. 9 is an illustration of an exemplary cellular protocol architecture, in accordance with an embodiment of the present invention.

FIG. 9 is an illustration of an exemplary cellular protocol architecture 900, in accordance with an embodiment of the present invention. In the present embodiment, the user equipment (UE) may utilize various cellular protocol architectures including 4G, LTE, and 5G as shown. The figure illustrates various software protocol stacks and highlights where in the software protocol stack the vehicle control application could reside.

Figure 10:
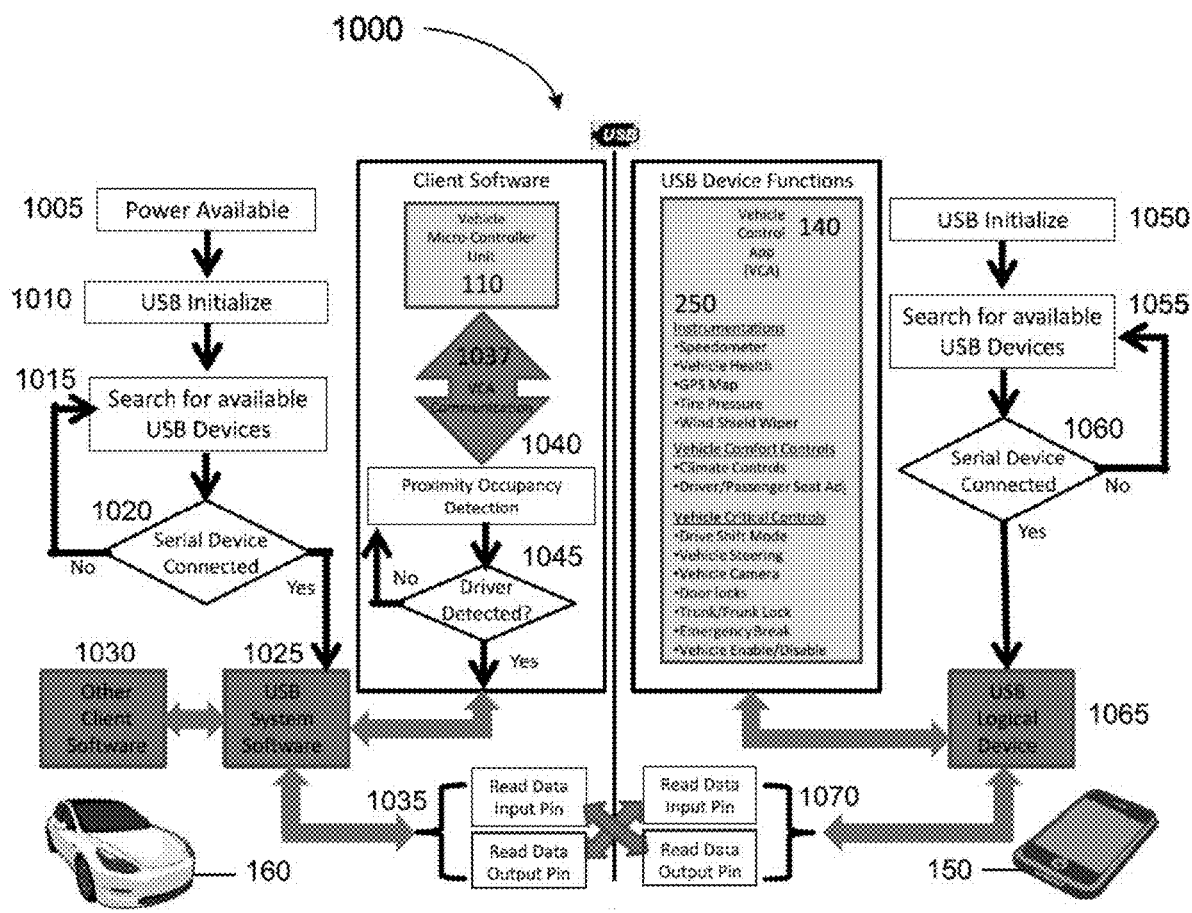
FIG. 10 is an illustration of an exemplary USB flow diagram, in accordance with an embodiment of the present invention.

FIG. 10 is an illustration of an exemplary USB flow diagram 1000, in accordance with an embodiment of the present invention. In the present embodiment, USB protocol flow diagram 1000 shows a method that may include, in Step 1005, checking for vehicle power. This is to ensure that there is ample power to activate communication and vehicle critical controls. If vehicle power is sufficient, USB communication device is initialized, in Step 1010. In step 1015, the vehicle microcontroller is ready to search for available USB devices. In step 1020, the vehicle detects the serial device connection from the mobile device. In step 1025, the data link meets the appropriate signal integrity requirements, the USB data link is established. In Step 1040, VCA communication with vehicle microcontroller unit 110 may be established where instrumentations, vehicle comfort controls, and vehicle critical controls 250 may be accessed by the vehicle control app (VCA) through vehicle microcontroller unit 110. Instrumentations may involve but not limited to a speedometer, vehicle health, GPS map, tire pressure, and windshield wiper. Vehicle comfort controls may involve but not limited to climate controls and driver/passenger seat adjustments. Vehicle critical controls may involve but not limited to drive shift mode, vehicle steering, vehicle camera, door locks, trunk/frunk lock, emergency break, and vehicle enable/disable. In Step 1040, proximity occupancy detection may be performed. In Step 1045, determine whether a vehicle driver is detected. If the driver is determined to be inside the vehicle or within a predetermined distance to the vehicle ("Yes"), a data link with the mobile device may be established.

In the mobile device side, in Step 1050, The driver will initiate the application on his/her mobile device and will connect to an available USB port in the vehicle. In step 1055, the mobile device will attempt to connect to the USB host. In step 1065, the data link meets the appropriate signal integrity requirements, the USB data link is established.

Figure 11:
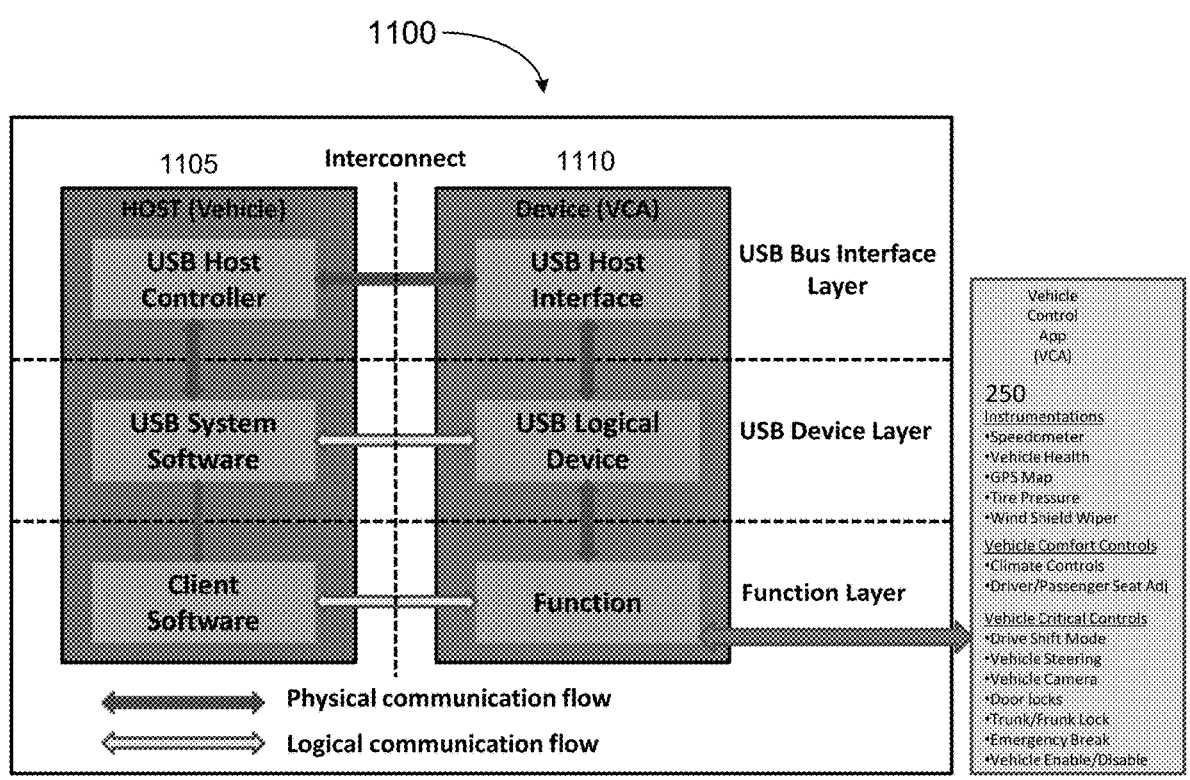
FIG. 11 is an illustration of an exemplary USB architecture, in accordance with an embodiment of the present invention.

FIG. 11 is an illustration of an exemplary USB architecture, in accordance with an embodiment of the present invention. In the present embodiment, the communication data between the VCA and the vehicle host will be transferred via the logical communication flow over the physical communication path.

Figure 12:
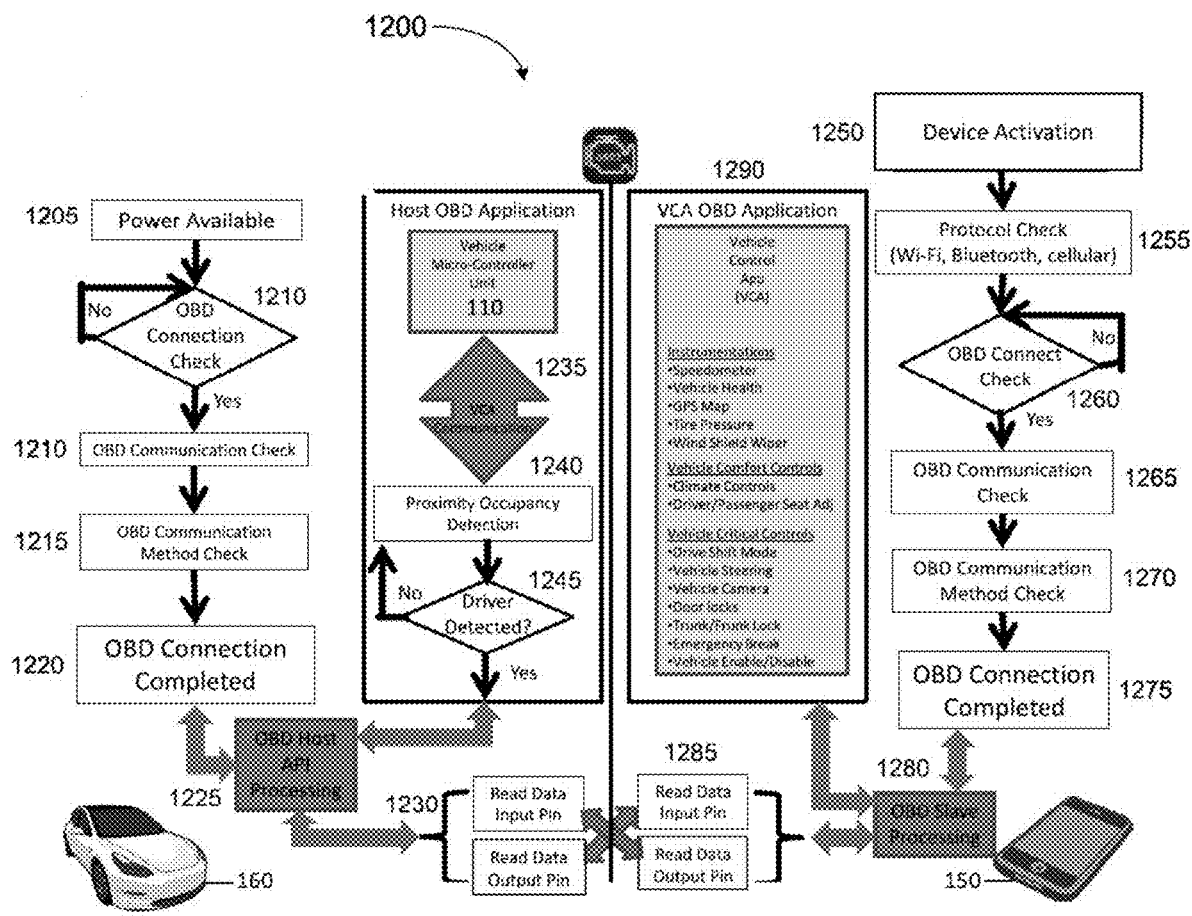
FIG. 12 is an illustration of an exemplary on-board diagnostics flow diagram, in accordance with an embodiment of the present invention.

FIG. 12 is an illustration of an exemplary on-board diagnostics flow diagram 1200, in accordance with an embodiment of the present invention. In the present embodiment, on board diagnostics flow diagram 1200 may include in Step 1205, on the vehicle side 160, vehicle power is checked. If vehicle power is available, OBD communication is checked in Step 1210 by physically connecting to the datalink connector. In Step 1215, OBD communication method is checked to verify which protocol is being utilized via the OBD-II interface. The possible protocols are ISO, CAN, PWM, KWP, and VPW. In Step 1220, OBD connection is complete. In Step 1225, OBD host API processing is performed. In Step 1230, data input and output pins are read.

On the mobile device side 150, in Step 1250, mobile device 150 is activated. In Step 1255, communication protocol may be determined. Communication protocols may include but not limited to Wi-Fi, Bluetooth, Cellular, etc. In Step 1260, OBD connection may be checked. In Step 1265, OBD communication is checked by physically connecting to the datalink connector. In Step 1270, OBD communication method is checked to verify which protocol is being utilized via the OBD-II interface. The possible protocols are ISO, CAN, PWM, KWP, and VPW . . . . In Step 1275, OBD connection is complete. In Step 1280, OBD slave processing is performed. In Step 1285, data input and output pins are read. In Step 1290, VCA OBD application is activated to access instrumentations, vehicle comfort controls, and vehicle critical controls. Instrumentations may involve but not limited to a speedometer, vehicle health, GPS map, tire pressure, and wind shield wiper. Vehicle comfort controls may involve but not limited to climate controls and driver/passenger seat adjustments. Vehicle critical controls may involve but not limited to drive shift mode, vehicle steering, vehicle camera, door locks, trunk/frunk lock, emergency break, and vehicle enable/disable.

Figure 13:
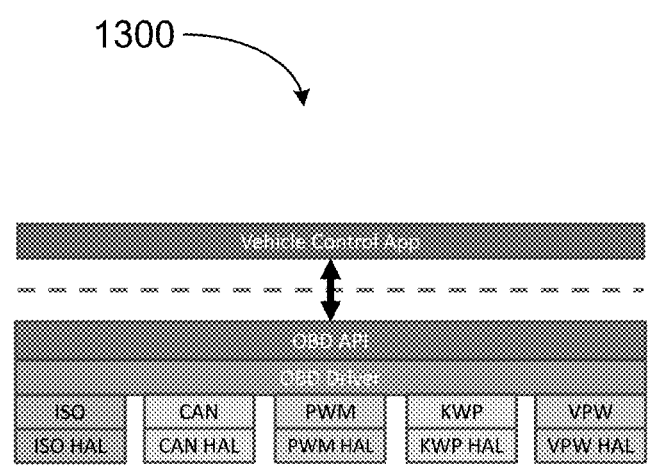
FIG. 13 is an illustration of an exemplary on-board diagnostics architecture, in accordance with an embodiment of the present invention.

FIG. 13 is an illustration of an exemplary on-board diagnostics architecture 1300, in accordance with an embodiment of the present invention. The communication data between the VCA and the vehicle host will be transferred via the Vehicle Control Application stack thru the OBD API and OBD Driver over the verified OBD protocol on the vehicle host.

Figure 14:
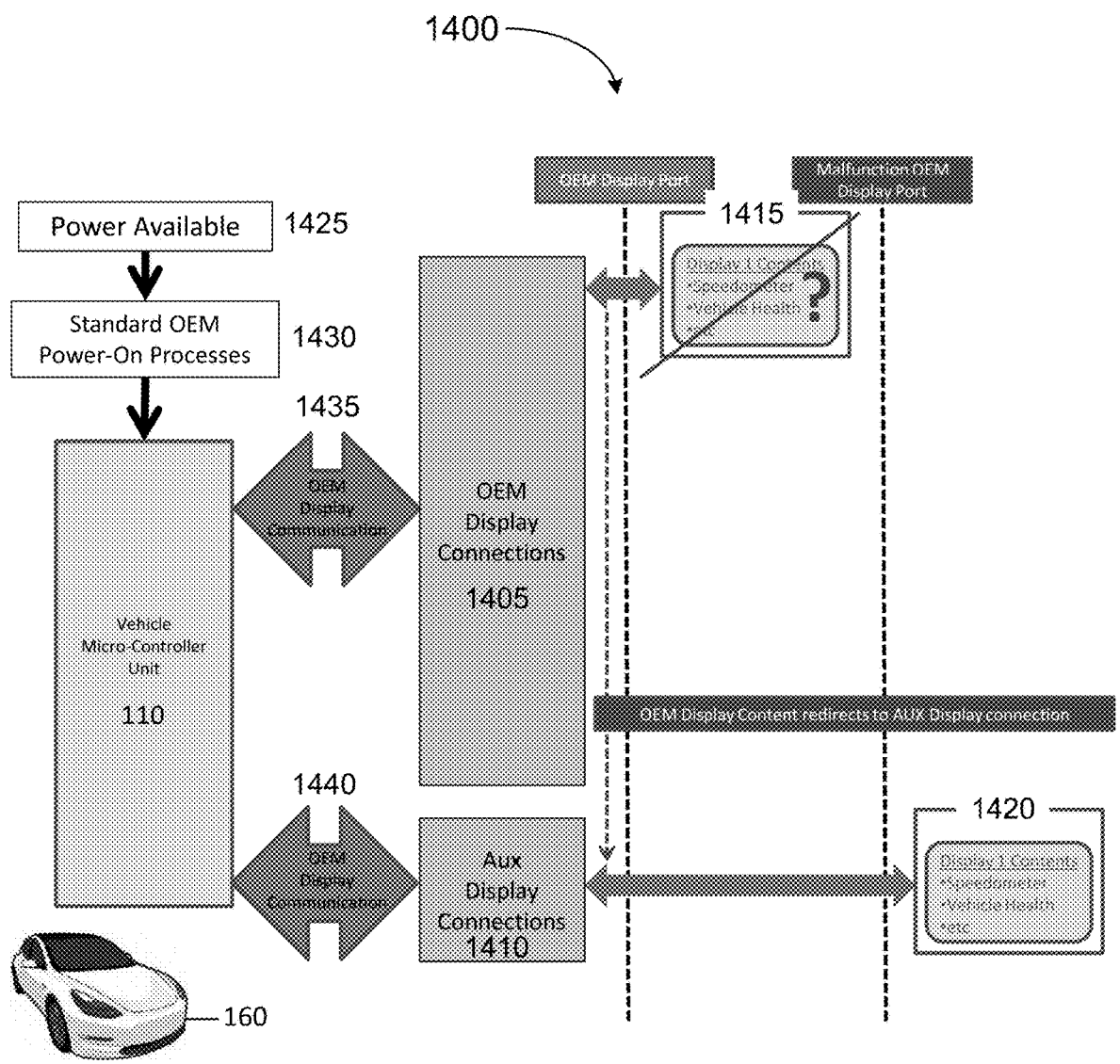
FIG. 14 is an illustration of an exemplary OEM display flow diagram, in accordance with an embodiment of the present invention.

FIG. 14 is an illustration of an exemplary OEM display flow diagram 1400, in accordance with an embodiment of the present invention. In the present embodiment, Standard OEM with single OEM display flow diagram 1400 may include in Step 1425, on the vehicle side 160, vehicle power is checked. If vehicle power is available, Vehicle Microcontroller Unit 110 communicates with the OEM display 1415 via the OEM Display Connection 1405. In the case the vehicle micro-controller detects a malfunction of OEM display 1415 or there is a desire to have an additional display for redundancy, an additional OEM accessory display or OEM compatible display 1420 can be installed via the Aux Display connection 1410. The content to be displayed on the OEM display 1415 and the OEM accessory display 1420 is completely configurable by the user via the display settings presented on 1415 or 1420.

Figure 15:
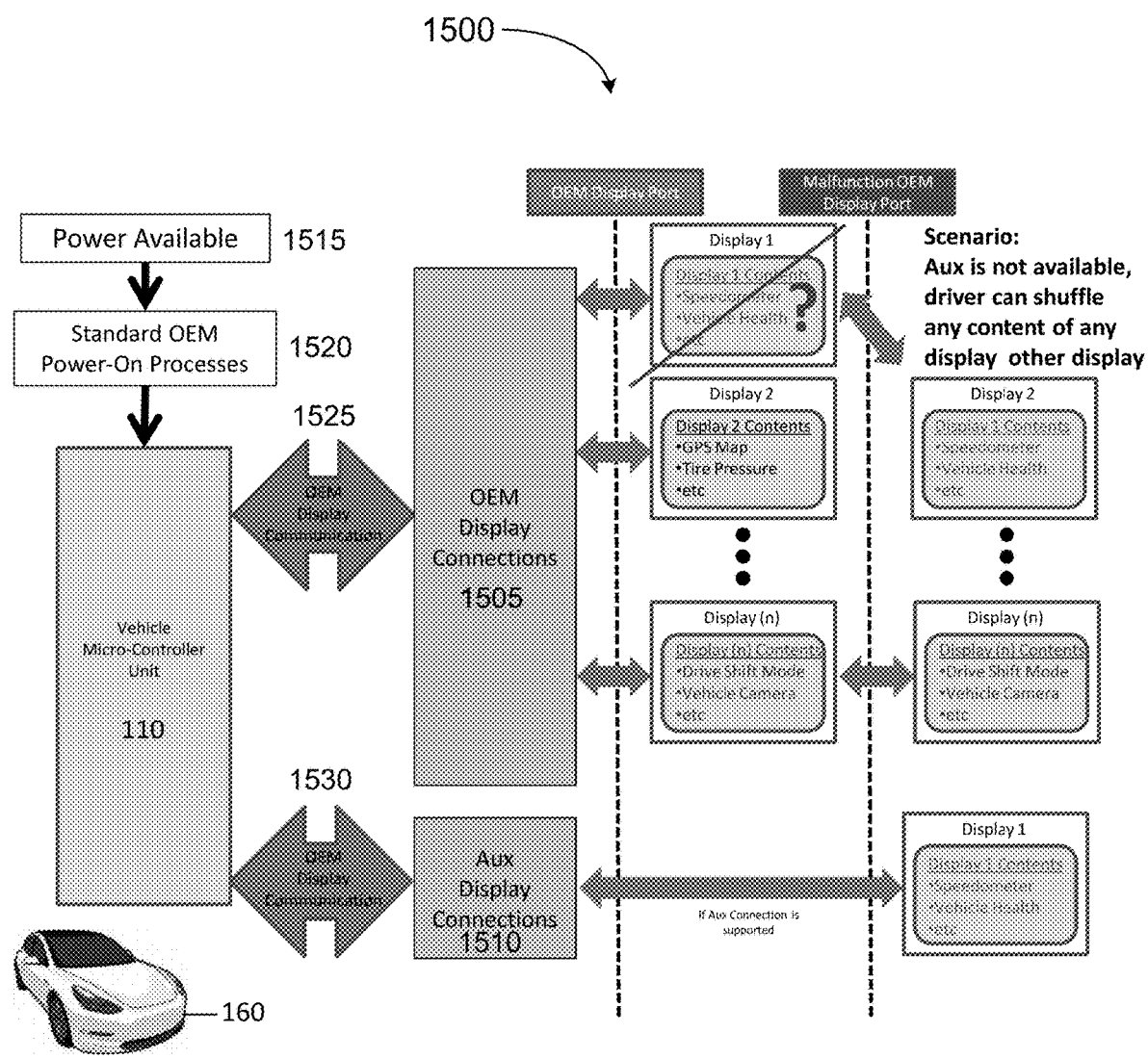
FIG. 15 is an illustration of an exemplary OEM cockpit flow diagram, in accordance with an embodiment of the present invention.
Figure 16:
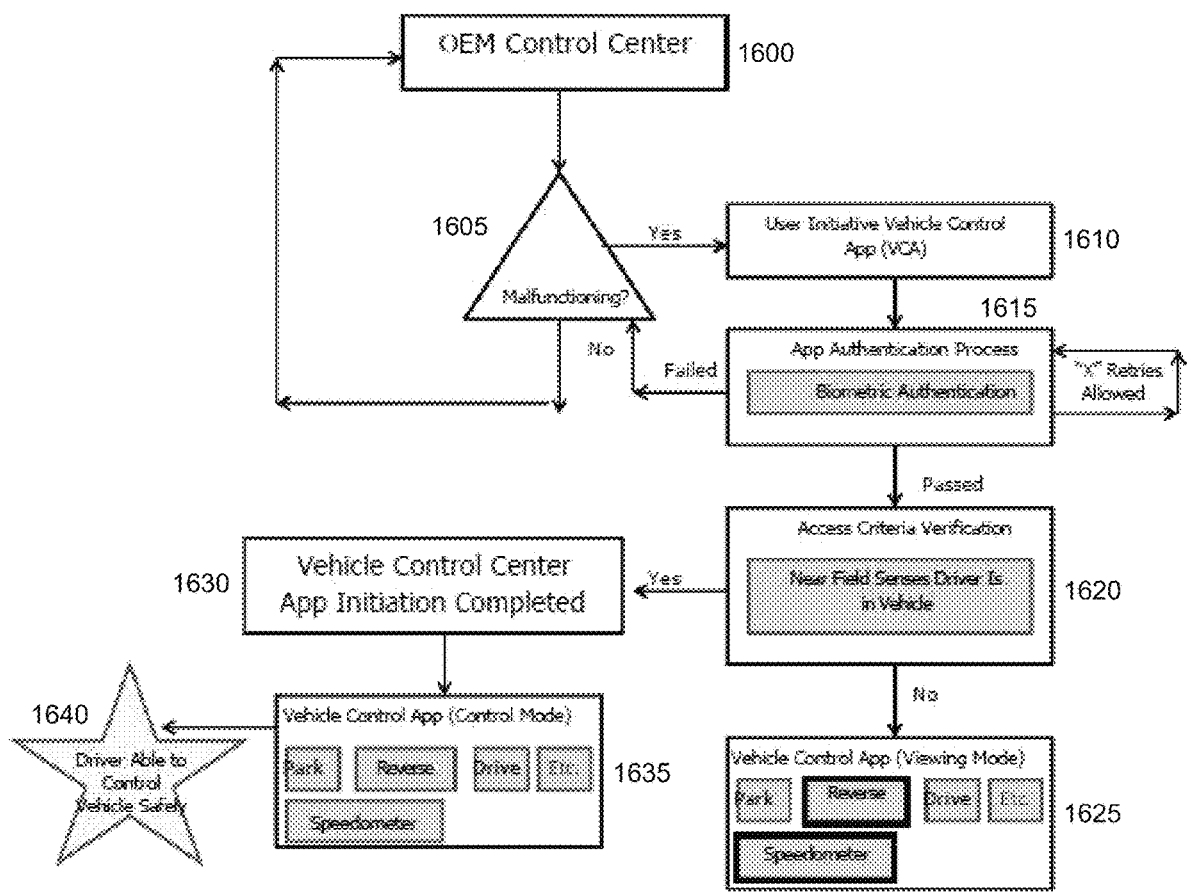
FIG. 16 is an illustration of an exemplary vehicle control flow diagram, in accordance with an embodiment of the present invention.

FIG. 15 is an illustration of an exemplary OEM cockpit flow diagram 1500, in accordance with an embodiment of the present invention. In the present embodiment, Standard OEM with multiple OEM display flow diagram 1500 may include in Step 1515, on the vehicle side 160, vehicle power is checked. If vehicle power is available, Vehicle Microcontroller Unit 110 communicates with the various OEM displays (Display 1, 2, 3 . . . n) via the OEM Display Connection 1505. In the case the vehicle micro-controller detects a malfunction of one or more OEM displays, the user can configure the contents of the malfunction display(s) to the remaining functioning display via the display settings on the functioning display. In addition, if there is a desire to have an additional display for redundancy, an additional OEM accessory display can be installed via the Aux Display connection 1510. The content displayed on the OEM displays and the OEM accessory display is completely configurable by the user via the display setting FIG. 16 is an illustration of an exemplary vehicle control flow diagram 1600, in accordance with an embodiment of the present invention. In the present embodiment, vehicle control flow diagram 1600 shows in Step 1600, access to the OEM control center. In Step 1605, check whether the OEM control center is malfunctioning. In Step 1610, the vehicle control app is initiated which provides an alternate or redundant capability to safely manipulate critical driver control features in the event that the primary OEM provided control feature is non-functional. In Step 1615, the authentication process is activated. Authentication may include, but not limited to, biometric screening, password-based authentication, certificate-based authentication, token-based authentication, etc. A predetermined number of tries may be allowed. If authentication fails ("Failed"), the process goes back to Step 1605. If authentication is successful ("Passed"), in Step 1620, access criteria may be verified. The access criteria may include, but not limited to, sensing with a proximity detector that the driver is in the vehicle or sensing the user mobile device to be within a predetermined distance around the vehicle. The proximity detector may include, but not limited to, near-field, Bluetooth, Wi-Fi, etc. In Step 1620, if access criteria are not met ("No"), the vehicle control app is only allowed in viewing mode. In Step 1630, if access criteria are met ("Yes"), the vehicle control app initiation is complete. In Step 1635, the vehicle control app may be allowed in control mode. In Step 1640, driver is able to control vehicle safety.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

Figure 17:
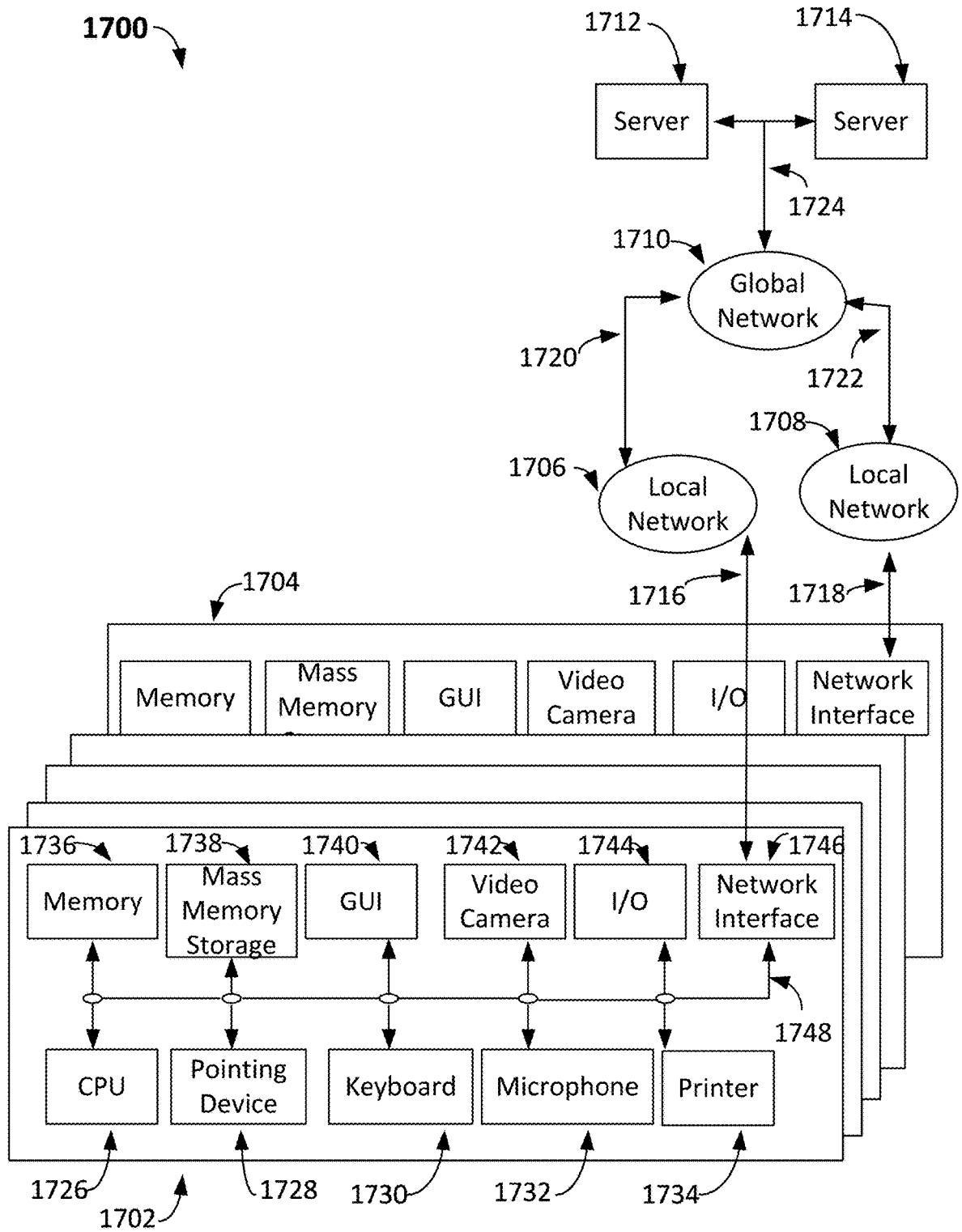
FIG. 17 is a block diagram depicting an exemplary client/server system which may be used by an exemplary web-enabled/networked embodiment of the present invention.

FIG. 17 is a block diagram depicting an exemplary client/server system 1700 which may be used by an exemplary web-enabled/networked embodiment of the present invention.

A communication system 1700 includes a multiplicity of clients with a sampling of clients denoted as a client 1702 and a client 1704, a multiplicity of local networks with a sampling of networks denoted as a local network 1706 and a local network 1708, a global network 1710 and a multiplicity of servers with a sampling of servers denoted as a server 1712 and a server 1714.

Client 1702 may communicate bi-directionally with local network 1706 via a communication channel 1716. Client 1704 may communicate bi-directionally with local network 1708 via a communication channel 1718. Local network 1706 may communicate bi-directionally with global network 1710 via a communication channel 1720. Local network 1708 may communicate bi-directionally with global network 1710 via a communication channel 1722. Global network 1710 may communicate bi-directionally with server 1712 and server 1714 via a communication channel 1724. Server 1712 and server 1714 may communicate bi-directionally with each other via communication channel 1724. Furthermore, clients 1702, 1704, local networks 1706, 1708, global network 1710 and servers 1712, 1714 may each communicate bi-directionally with each other.

In one embodiment, global network 1710 may operate as the Internet. It will be understood by those skilled in the art that communication system 1700 may take many different forms. Non-limiting examples of forms for communication system 1700 include local area networks (LANs), wide area networks (WANs), wired telephone networks, wireless networks, or any other network supporting data communication between respective entities.

Clients 1702 and 1704 may take many different forms. Non-limiting examples of clients 1702 and 1704 include personal computers, personal digital assistants (PDAs), cellular phones and smartphones.

Client 1702 includes a CPU 1726, a pointing device 1728, a keyboard 1730, a microphone 1732, a printer 1734, a memory 1736, a mass memory storage 1738, a GUI 1740, a video camera 1742, an input/output interface 1744 and a network interface 1746.

CPU 1726, pointing device 1728, keyboard 1730, microphone 1732, printer 1734, memory 1736, mass memory storage 1738, GUI 1740, video camera 1742, input/output interface 1744 and network interface 1746 may communicate in a unidirectional manner or a bi-directional manner with each other via a communication channel 1748. Communication channel 1748 may be configured as a single communication channel or a multiplicity of communication channels.

CPU 1726 may be comprised of a single processor or multiple processors. CPU 1726 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general-purpose microprocessors.

As is well known in the art, memory 1736 is used typically to transfer data and instructions to CPU 1726 in a bi-directional manner. Memory 1736, as discussed previously, may include any suitable computer-readable media, intended for data storage, such as those described above excluding any wired or wireless transmissions unless specifically noted. Mass memory storage 1738 may be coupled bi-directionally to CPU 1726, may provide additional data storage capacity, and may include any of the computer-readable media described above. Mass memory storage 1738 may be used to store programs, data and the like and is typically a secondary storage medium such as a hard disk. It will be appreciated that the information retained within mass memory storage 1738, may, in appropriate cases, be incorporated in standard fashion as part of memory 1736 as virtual memory.

CPU 1726 may be coupled to GUI 1740. GUI 1740 enables a user to view the operation of computer operating system and software. CPU 1726 may be coupled to pointing device 1728. Non-limiting examples of pointing device 1728 include computer mouse, trackball, and touchpad. Pointing device 1728 enables a user with the capability to maneuver a computer cursor about the viewing area of GUI 1740 and select areas or features in the viewing area of GUI 1740. CPU 1726 may be coupled to keyboard 1730. Keyboard 1730 enables a user with the capability to input alphanumeric textual information to CPU 1726. CPU 1726 may be coupled to microphone 1732. Microphone 1732 enables audio produced by a user to be recorded, processed, and communicated by CPU 1726. CPU 1726 may be connected to printer 1734. Printer 1734 enables a user with the capability to print information to a sheet of paper. CPU 1726 may be connected to video camera 1742. Video camera 1742 enables video produced or captured by user to be recorded, processed, and communicated by CPU 1726.

CPU 1726 may also be coupled to input/output interface 1744 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1726 optionally may be coupled to network interface 1746 which enables communication with an external device such as a database or a computer or telecommunications or internet network using an external connection shown generally as communication channel 1716, which may be implemented as a hardwired or wireless communications link using suitable conventional technologies. With such a connection, CPU 1726 might receive information from the network, or might output information to a network in the course of performing the method steps described in the teachings of the present invention.

Figure 18:
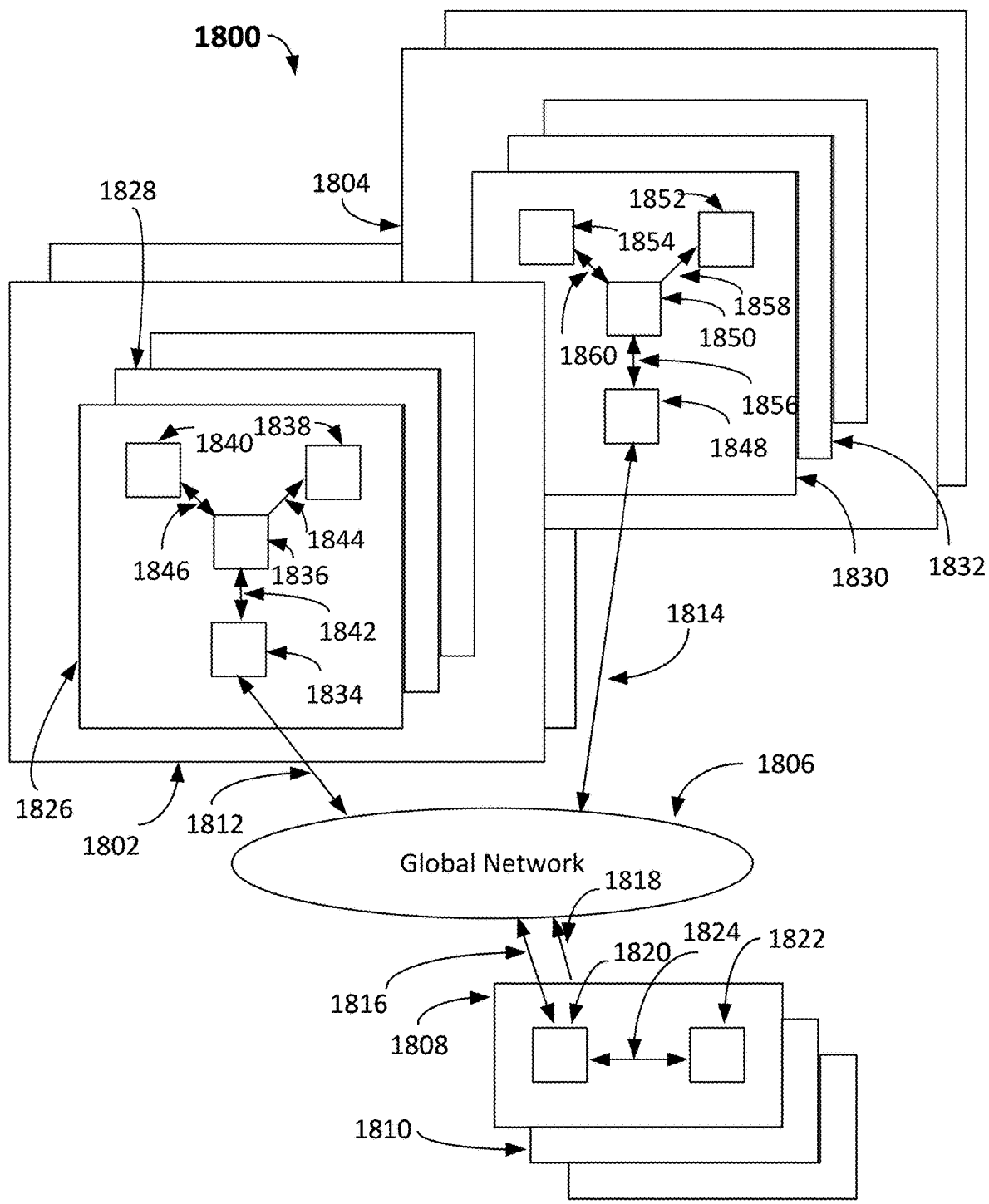
FIG. 18 illustrates a block diagram depicting a conventional client/server communication system, which may be used by an exemplary web-enabled/networked embodiment of the present invention.

FIG. 18 illustrates a block diagram depicting a conventional client/server communication system, which may be used by an exemplary web-enabled/networked embodiment of the present invention.

A communication system 1800 includes a multiplicity of networked regions with a sampling of regions denoted as a network region 1802 and a network region 1804, a global network 1806 and a multiplicity of servers with a sampling of servers denoted as a server device 1808 and a server device 1810.

Network region 1802 and network region 1804 may operate to represent a network contained within a geographical area or region. Non-limiting examples of representations for the geographical areas for the networked regions may include postal zip codes, telephone area codes, states, counties, cities, and countries. Elements within network region 1802 and 1804 may operate to communicate with external elements within other networked regions or within elements contained within the same network region.

In some implementations, global network 1806 may operate as the Internet. It will be understood by those skilled in the art that communication system 1800 may take many different forms. Non-limiting examples of forms for communication system 1800 include local area networks (LANs), wide area networks (WANs), wired telephone networks, cellular telephone networks or any other network supporting data communication between respective entities via hardwired or wireless communication networks. Global network 1806 may operate to transfer information between the various networked elements.

Server device 1808 and server device 1810 may operate to execute software instructions, store information, support database operations and communicate with other networked elements. Non-limiting examples of software and scripting languages which may be executed on server device 1808 and server device 1810 include C, C++, C #, and Java.

Network region 1802 may operate to communicate bi-directionally with global network 1806 via a communication channel 1812. Network region 1804 may operate to communicate bi-directionally with global network 1806 via a communication channel 1814. Server device 1808 may operate to communicate bi-directionally with global network 1806 via a communication channel 1816. Server device 1810 may operate to communicate bi-directionally with global network 1806 via a communication channel 1818. Network region 1802 and 1804, global network 1806 and server devices 1808 and 1810 may operate to communicate with each other and with every other networked device located within communication system 1800.

Server device 1808 includes a networking device 1820 and a server 1822. Networking device 1820 may operate to communicate bi-directionally with global network 1806 via communication channel 1816 and with server 1822 via a communication channel 1824. Server 1822 may operate to execute software instructions and store information.

Network region 1802 includes a multiplicity of clients with a sampling denoted as a client 1826 and a client 1828. Client 1826 includes a networking device 1834, a processor 1836, a GUI 1838 and an interface device 1840. Non-limiting examples of devices for GUI 1838 include monitors, televisions, cellular telephones, smartphones, and PDAs (Personal Digital Assistants). Non-limiting examples of interface device 1840 include pointing device, mouse, trackball, scanner, and printer. Networking device 1834 may communicate bi-directionally with global network 1806 via communication channel 1812 and with processor 1836 via a communication channel 1842. GUI 1838 may receive information from processor 1836 via a communication channel 1844 for presentation to a user for viewing. Interface device 1840 may operate to send control information to processor 1836 and to receive information from processor 1836 via a communication channel 1846. Network region 1804 includes a multiplicity of clients with a sampling denoted as a client 1830 and a client 1832. Client 1830 includes a networking device 1848, a processor 1850, a GUI 1852 and an interface device 1854. Non-limiting examples of devices for GUI 1838 include monitors, televisions, cellular telephones, smartphones, and PDAs (Personal Digital Assistants). Non-limiting examples of interface device 1840 include pointing devices, mousse, trackballs, scanners, and printers. Networking device 1848 may communicate bi-directionally with global network 1806 via communication channel 1814 and with processor 1850 via a communication channel 1856. GUI 1852 may receive information from processor 1850 via a communication channel 1858 for presentation to a user for viewing. Interface device 1854 may operate to send control information to processor 1850 and to receive information from processor 1850 via a communication channel 1860.

For example, consider the case where a user interfacing with client 1826 may want to execute a networked application. A user may enter the IP (Internet Protocol) address for the networked application using interface device 1840. The IP address information may be communicated to processor 1836 via communication channel 1846. Processor 1836 may then communicate the IP address information to networking device 1834 via communication channel 1842. Networking device 1834 may then communicate the IP address information to global network 1806 via communication channel 1812. Global network 1806 may then communicate the IP address information to networking device 1820 of server device 1808 via communication channel 1816. Networking device 1820 may then communicate the IP address information to server 1822 via communication channel 1824. Server 1822 may receive the IP address information and after processing the IP address information may communicate return information to networking device 1820 via communication channel 1824. Networking device 1820 may communicate the return information to global network 1806 via communication channel 1816. Global network 1806 may communicate the return information to networking device 1834 via communication channel 1812. Networking device 1834 may communicate the return information to processor 1836 via communication channel 1842. Processor 1836 may communicate the return information to GUI 1838 via communication channel 1844. User may then view the return information on GUI 1838.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied. Such computers referenced and/or described in this disclosure may be any kind of computer, either general purpose, or some specific purpose computer such as, but not limited to, a workstation, a mainframe, GPU, ASIC, etc. The programs may be written in C, or Java, Brew, or any other suitable programming language. The programs may be resident on a storage medium, e.g., magnetic, or optical, e.g., without limitation, the computer hard drive, a removable disk, or media such as, without limitation, a memory stick or SD media, or other removable medium. The programs may also be run over a network, for example, with a server or other machine sending signals to the local machine, which allows the local machine to carry out the operations described herein.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6). In some embodiments, the methods and/or system components which may be located and/or performed remotely include, without limitation:

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breath life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

A minor variation to a prior embodiment would be inclusion of the 5G cellular protocol for FIG. 8.

A minor variation to a prior embodiment would be inclusion of the USB-C protocol for FIG. 10.

A minor variation to a prior embodiment would be inclusion of a next generation diagnostics protocol to replace the OBD-II standard for FIG. 12.

All the features disclosed in this specification, including any accompanying abstract and drawings, may be replaced by alternative features serving the same, equivalent, or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant (s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing vehicle control systems according to the present invention will be apparent to those skilled in the art. Various aspects of the invention have been described above by way of illustration, and the specific embodiments disclosed are not intended to limit the invention to the particular forms disclosed. The particular implementation of the vehicle control systems may vary depending upon the particular context or application. By way of example, and not limitation, the vehicle control systems described in the foregoing were principally directed to vehicle control systems implementations; however, similar techniques may instead be applied to remote communication and control of computerized mechanical components, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A method, comprising:
   determining if a malfunction has occurred in the control module of a vehicle;
   initiating a bi-directional vehicle control app on a mobile device of a user;
   authenticating said user;
   verifying if said user is in said vehicle;
   upon authenticating said user and verifying if said user is in said vehicle, displaying a "view mode" interface on said user's mobile device, if said user is not in said vehicle;
   upon authenticating said user and verifying if said user is in said vehicle, displaying a "control mode" interface on said user's mobile device if said user is in said vehicle;
   said "view mode" interface on said user's mobile device displaying a set of read-only status and conditions of said vehicle;
   said "control mode" interface on said user's mobile device displaying a set of interactive status and condition options that, when engaged, sends commands to said vehicle's control module for performing tasks, including:
      controlling a driveshaft of said vehicle;
      displaying a resulting speedometer output;
      enabling said vehicle; and
      disabling said vehicle.

2. The method, as recited in claim 1, wherein said "control mode" provides usage of critical vehicle information that configures the user's mobile device as a redundant system for safety in the event the vehicle's OEM primary media control unit fails.

3. The method, as recited in claim 1, wherein the "control mode" interface on said user's mobile device displaying a set of interactive status and condition options that, when engaged, sends commands to said vehicle's control module for performing tasks, further includes:
   controlling shifting of said vehicle;
   controlling steering of said vehicle;
   controlling the emergency brake of said vehicle; and
   displaying said vehicle's health.

4. The method, as recited in claim 1, further comprising:
   determining if said malfunction has occurred by pinging a vehicle's microcontroller and determining if said microcontroller is unresponsive; and
   shifting control of components of said vehicle to an interface control on a user's mobile device, wherein said interface control utilizes a connection selected from a group consisting of a wireless and a wired connection.

5. The method, as recited in claim 4, wherein said interface control is a wireless connection selected from the group consisting of a WIFI signal, Bluetooth signal, 4G Cellular Signal, LTE Cellular Signal, and a 5G Cellular Signal.

6. The method, as recited in claim 4, wherein said interface control is a wired connection selected from the group consisting of a Thunderbolt connection, Firewire connection, USB connection, OBD connection, Auxiliary Port, and a Display Port connection.

7. The method, as recited in claim 5, wherein if said interface control is a wireless connection of a WIFI, the method further includes the steps of:
   checking whether power is being received by said vehicle's components is sufficient;
   initiating a Wi-Fi signal if power is available;
   starting an 802.1x wireless access phase;
   initiating an 802.1x wireless access phase for vehicle's Wi-Fi interface;
   initiating, on said user's mobile device, a software application, wherein said user will select the appropriate vehicle Wi-Fi network connection;
   authenticating credentials of the user's mobile phone by the vehicle's microcontroller unit;
   establishing a connection upon successful verification and authentication of a user's mobile phone; and
   granting access to vehicle's components for control through said user's mobile device.

8. The method, as recited in claim 5, wherein if said interface control is a wireless connection of a Bluetooth, the method further includes the steps of:
   checking whether power is being received by said vehicle's components is sufficient;
   checking if a new user Bluetooth pairing is established, and if pairing is established, a Bluetooth connection if formed, if not, user will complete Bluetooth pairing process including initiating a discovery or pairing request, broadcasting said request, verifying credentials, whereby a Bluetooth connection is formed;
   authenticating credentials of the user's mobile phone by the vehicle's microcontroller unit;
   establishing a connection upon successful verification and authentication of a user's mobile phone; and
   granting access to vehicle's components for control through said user's mobile device.

9. The method, as recited in claim 5, wherein if said interface control is a wireless connection of a Cellular Signal, the method further includes the steps of:

checking whether power is being received by said vehicle's components is sufficient;
synchronizing of user's mobile device and vehicle's microcontroller if power is sufficient;
authenticating said user's mobile device and encrypting a connection between said user's mobile device and said vehicle's microcontroller;
verify that said user's mobile device is registered with the cellular communication of the vehicle;
complete attachment of said user's mobile device to said network;
establishing a datalink over said network between said user's mobile device and said vehicle's microcontroller; and
granting access to vehicle's components for control through said user's mobile device.

10. The method, as recited in claim 6, wherein if said interface control is a wired connection of a USB, the method further includes the steps of:
checking whether power is being received by said vehicle's components is sufficient;
initializing USB communication if power is sufficient;
searching, by said vehicle's microcontroller, for available USB devices;
detecting the serial device connection from a user's mobile device;
establishing a datalink if appropriate signal integrity requirements are met; and
granting access to vehicle's components for control through said user's mobile device.

11. The method, as recited in claim 6, wherein if said interface control is a wired connection of a OBD connection, the method further includes the steps of:
checking whether power is being received by said vehicle's components is sufficient;
checking a communication connection with said vehicle's OBD, if sufficient power is available, by physically connecting to a datalink connector;
verifying which communication protocol is being utilized via an OBD-II interface;
completing OBD connection;
performing OBD host API processing;
reading data input and output pins for communication;
activating said user's mobile device;
determining a communication protocol including Wi-Fi, Bluetooth, and Cellular;
connecting said user's mobile phone to said OBD through said communication protocol;
performing OBD slave processing;
establishing a datalink if appropriate signal integrity requirements are met; and
granting access to vehicle's components for control through said user's mobile device.

12. A system, comprising:
a set of controllable components on a vehicle configured for bi-directional communication;
a mobile device configured for bi-directional communication;
an interface for transmission of communications between said mobile device and said vehicle;
at least one non-transitory computer-readable digital storage medium with an executable software program application stored thereon, wherein the software program application instructs one or more micro-processors to perform a method comprising the steps of:
determining if a malfunction has occurred in the control module of a vehicle;
initiating a bi-directional vehicle control app on a mobile device of a user;
authenticating said user;
verifying if said user is in said vehicle;
upon authenticating said user and verifying if said user is in said vehicle, displaying a "view mode" interface on said user's mobile device, if said user is not in said vehicle;
upon authenticating said user and verifying if said user is in said vehicle, displaying a "control mode" interface on said user's mobile device if said user is in said vehicle;
said "view mode" interface on said user's mobile device displaying a set of read-only status and conditions of said vehicle; and
said "control mode" interface on said user's mobile device displaying a set of interactive status and condition options that, when engaged, sends commands to said vehicle's control module for performing tasks, including: controlling a driveshaft of said vehicle, displaying a resulting speedometer output, enabling said vehicle, and disabling said vehicle.

13. The system as recited in claim 12 wherein said mobile device is configured to emulate a vehicle's micro-controller, wherein a status notification and a condition notification is received by said mobile device and said mobile device contains executable tasks on a memory whereby execution of said tasks send commands through said interface to influence actions and functional outputs on said vehicle.

14. The system as recited in claim 12 wherein said "control mode" provides usage of critical vehicle information that configures the user's mobile device as a redundant system for safety in the event the vehicle's OEM primary media control unit fails.

15. The system as recited in claim 12, wherein the "control mode" interface on said user's mobile device displays a set of interactive status and condition options that, when engaged, sends commands to said vehicle's control module for performing tasks, further includes:
controlling shifting of said vehicle;
controlling steering of said vehicle;
controlling the emergency brake of said vehicle; and
displaying said vehicle's health.

16. The system as recited in claim 12, wherein the at least one non-transitory computer-readable digital storage medium with an executable software program application stored thereon, further includes the software program application instructs one or more micro-processors to perform a method comprising the steps of:
determining if said malfunction has occurred by pinging a vehicle's microcontroller and determining if said microcontroller is unresponsive; and
shifting control of components of said vehicle to an interface control on a user's mobile device, wherein said interface control utilizes a connection selected from a group consisting of a wireless and a wired connection.

17. The system as recited in claim 12, wherein said interface control is a wireless connection selected from the group consisting of a WIFI signal, Bluetooth signal, 4G Cellular Signal, LTE Cellular Signal, and a 5G Cellular Signal.

18. The system as recited in claim 12, wherein said interface control is a wired connection selected from the group consisting of a Thunderbolt connection, Firewire connection, USB connection, OBD connection, Auxiliary Port, and a Display Port connection.

19. A system, comprising:
a means for determining if a malfunction has occurred in the control module of a vehicle;
a means for initiating a bi-directional vehicle control app on a mobile device of a user;
a means for authenticating said user;
a means for verifying if said user is in said vehicle;
a means for displaying a "view mode" interface on said user's mobile device upon authenticating said user and verifying if said user is in said vehicle, if said user is not in said vehicle;
a means for displaying a "control mode" interface on said user's mobile device upon authenticating said user and verifying if said user is in said vehicle, if said user is in said vehicle;
a means for displaying a set of read-only status and conditions of said vehicle as said "view mode" interface;
a means for displaying a set of interactive status and condition options that, when engaged, sends commands to said vehicle's control module for performing tasks as said "control mode" interface, including:
controlling a driveshaft of said vehicle;
displaying a resulting speedometer output;
enabling said vehicle; and
disabling said vehicle.

20. A system, comprising:
a set of controllable components on a vehicle configured for bi-directional communication;
a mobile device configured for bi-directional communication;
an interface for transmission of communications between said mobile device and said vehicle;
at least one non-transitory computer-readable digital storage medium with an executable software program application stored thereon, wherein the software program application instructs one or more micro-processors to perform a method comprising the steps of:
determining if a malfunction has occurred in the control module of a vehicle;
initiating a bi-directional vehicle control app on a mobile device of a user;
authenticating said user;
verifying if said user is in said vehicle;
upon authenticating said user and verifying if said user is in said vehicle, displaying a "view mode" interface on said user's mobile device, if said user is not in said vehicle;
upon authenticating said user and verifying if said user is in said vehicle, displaying a "control mode" interface on said user's mobile device if said user is in said vehicle;
said "view mode" interface on said user's mobile device displaying a set of read-only status and conditions of said vehicle; and
said "control mode" interface on said user's mobile device displaying a set of interactive status and condition options that, when engaged, sends commands to said vehicle's control module for performing tasks, including: controlling steering of said vehicle, control emergency braking of said vehicle, and displaying a health indication of said vehicle.

21. The system as recited in claim 20, further comprising:
said mobile device is configured to emulate a vehicle's micro-controller, wherein a status notification and a condition notification is received by said mobile device and said mobile device contains executable tasks on a memory whereby execution of said tasks send commands through said interface to influence actions and functional outputs on said vehicle,
said "control mode" provides usage of critical vehicle information that configures the user's mobile device as a redundant system for safety in the event the vehicle's OEM primary media control unit fails,
said at least one non-transitory computer-readable digital storage medium with an executable software program application stored thereon, further includes the software program application instructs one or more microprocessors to perform a method comprising the steps of:
determining if said malfunction has occurred by pinging said vehicle's microcontroller and determining if said microcontroller is unresponsive; and
shifting control of components of said vehicle to an interface control on a user's mobile device, wherein said interface control utilizes a connection selected from a group consisting of a wireless and a wired connection.

22. The system as recited in claim 21, wherein said interface control is a wireless connection selected from the group consisting of a WIFI signal, Bluetooth signal, 4G Cellular Signal, LTE Cellular Signal, and a 5G Cellular Signal.

23. The system as recited in claim 21, wherein said interface control is a wired connection selected from the group consisting of a Thunderbolt connection, Firewire connection, USB connection, OBD connection, Auxiliary Port, and a Display Port connection.

24. A system, comprising:
a set of controllable components on a vehicle configured for bi-directional communication;
a mobile device configured for bi-directional communication;
an interface for transmission of communications between said mobile device and said vehicle;
at least one non-transitory computer-readable digital storage medium with an executable software program application stored thereon, wherein the software program application instructs one or more micro-processors to perform a method comprising the steps of:
determining if a malfunction has occurred in the control module of a vehicle;
initiating a bi-directional vehicle control app on a mobile device of a user;
authenticating said user;
verifying if said user is in said vehicle;
upon authenticating said user and verifying if said user is in said vehicle, displaying a "view mode" interface on said user's mobile device, if said user is not in said vehicle;
upon authenticating said user and verifying if said user is in said vehicle, displaying a "control mode" interface on said user's mobile device if said user is in said vehicle;
said "view mode" interface on said user's mobile device displaying a set of read-only status and conditions of said vehicle; and
said "control mode" interface on said user's mobile device displaying a set of interactive status and condition options that, when engaged, sends commands to said vehicle's control module for performing tasks, including: monitoring GPS data, manipulating GPS data, monitoring cameras, monitoring climate controls, manipulating climate controls, controlling functionality of a trunk, and controlling functionality of a trunk frunk, if applicable.

25. The system as recited in claim 24, further comprising:
said mobile device is configured to emulate a vehicle's micro-controller, wherein a status notification and a condition notification is received by said mobile device and said mobile device contains executable tasks on a memory whereby execution of said tasks send commands through said interface to influence actions and functional outputs on said vehicle, said "control mode" provides usage of critical vehicle information that configures the user's mobile device as a redundant system for safety in the event the vehicle's OEM primary media control unit fails, said at least one non-transitory computer-readable digital storage medium with an executable software program application stored thereon, further includes the software program application instructs one or more microprocessors to perform a method comprising the steps of:

determining if said malfunction has occurred by pinging said vehicle's microcontroller and determining if said microcontroller is unresponsive; and shifting control of components of said vehicle to an interface control on a user's mobile device, wherein said interface control utilizes a connection selected from a group consisting of a wireless and a wired connection.

26. The system as recited in claim 25, wherein said interface control is a wireless connection selected from the group consisting of a WIFI signal, Bluetooth signal, 4G Cellular Signal, LTE Cellular Signal, and a 5G Cellular Signal.

27. The system as recited in claim 25, wherein said interface control is a wired connection selected from the group consisting of a Thunderbolt connection, Firewire connection, USB connection, OBD connection, Auxiliary Port, and a Display Port connection.

* * * * *